United States Patent [19]

Merrick

[11] 4,408,582

[45] Oct. 11, 1983

[54] ELECTRONIC ENGINE CONTROL

[75] Inventor: James W. Merrick, El Paso, Tex.

[73] Assignee: General Dynamics Corporation, St. Louis, Mo.

[21] Appl. No.: 229,924

[22] Filed: Jan. 30, 1981

Related U.S. Application Data

[62] Division of Ser. No. 899,355, Apr. 24, 1978, Pat. No. 4,284,053.

[51] Int. Cl.$^3$ .......................... F02B 3/00; F02P 5/04; F02M 39/00
[52] U.S. Cl. .................................... 123/415; 123/452; 123/458; 123/482; 123/423
[58] Field of Search ............... 123/415, 416, 417, 478, 123/480, 482, 486

[56] References Cited

U.S. PATENT DOCUMENTS

| | | | |
|---|---|---|---|
| 3,788,285 | 1/1974 | Gelin et al. | 123/32 EA |
| 3,888,220 | 6/1975 | Bigalke | 123/415 |
| 3,910,243 | 10/1975 | Gau et al. | 123/117 R |
| 3,935,851 | 2/1976 | Wright | 123/139 E |
| 3,952,715 | 4/1976 | Van Sicklen | 123/117 R |
| 3,982,555 | 9/1976 | Aubel et al. | 123/117 A X |
| 4,011,757 | 3/1977 | Baatz | 73/114 X |
| 4,048,964 | 9/1977 | Kissel | 123/482 |
| 4,104,998 | 8/1978 | Fenn | 123/415 |
| 4,125,093 | 11/1978 | Platzer | 123/32 EA |

Primary Examiner—Ronald B. Cox
Attorney, Agent, or Firm—Fitch, Even, Tabin & Flannery

[57] ABSTRACT

An electronic controller for an internal combustion engine provides a ratio control signal corresponding to a respective air/fuel ratio, and responds to an air flow signal, a fuel flow signal and the ratio control signal to control fuel flow as to make the ratio of air flow to fuel flow substantially equal to said respective air/fuel ratio. The ratio control signal is developed from a base run ratio control signal as modified in response to various parameters such as engine temperature, manifold pressure, idle, manifold vacuum, fuel temperature, wide open throttle, engine speed, and start. The controller also provides a speed-up circuit for promptly responding to change in air flow and dynamic braking for the fuel metering pump. The pump speed circuit includes a range extender. The controller further provides a timing advance control signal in response to air/fuel ratio and various engine parameters such as engine speed, manifold pressure, throttle position, engine temperature, air temperature, air/fuel ratio, and start.

9 Claims, 18 Drawing Figures

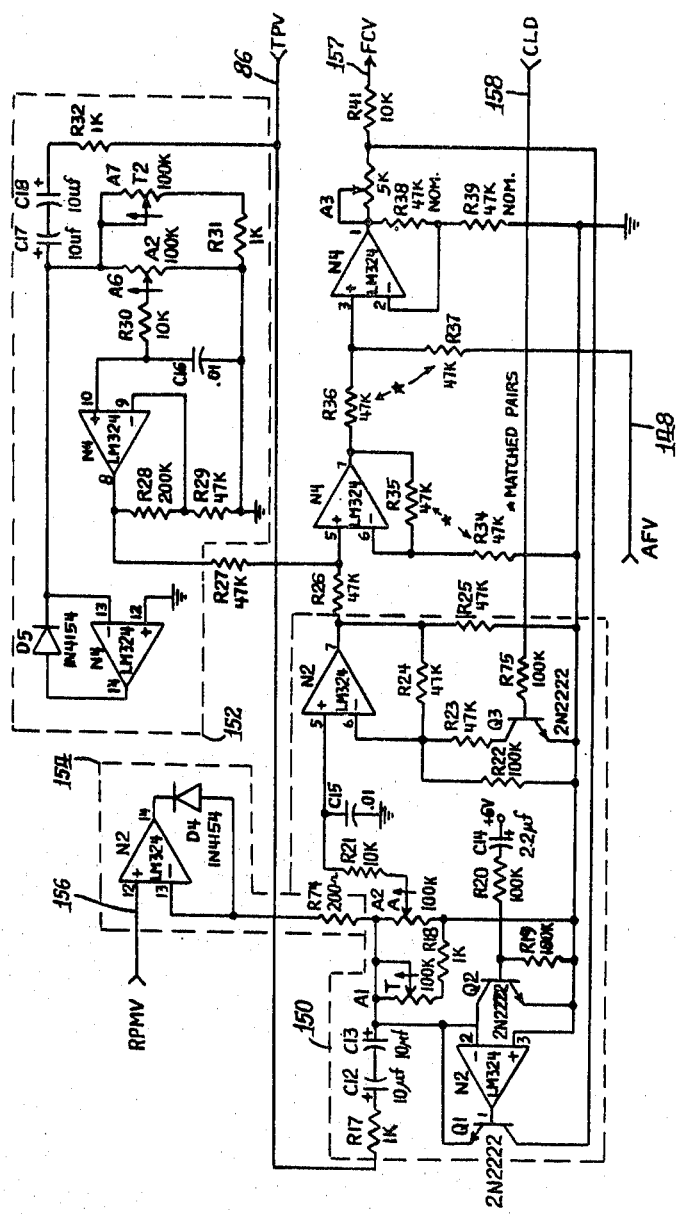
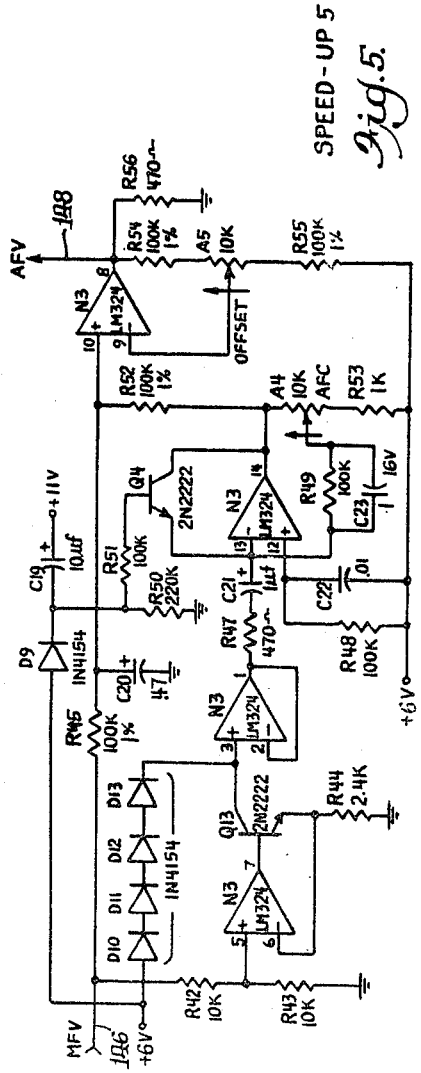
Fig. 6. ACCELERATOR PUMP 6
Fig. 5. SPEED-UP 5

RATIO CONTROL II-9

THROTTLE BY PASS CONTROL 10

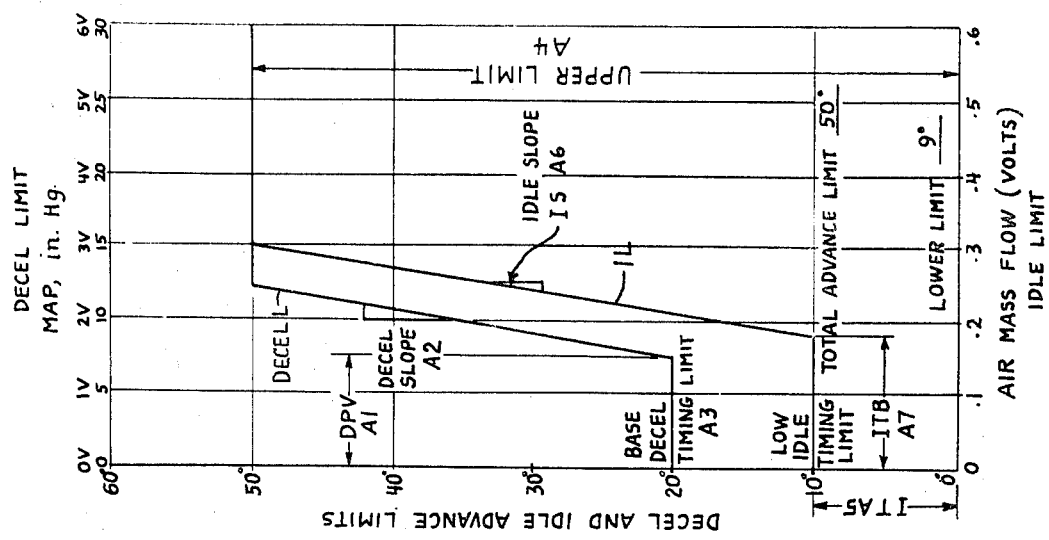
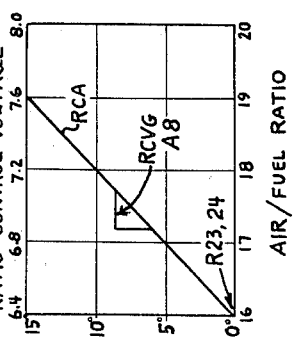
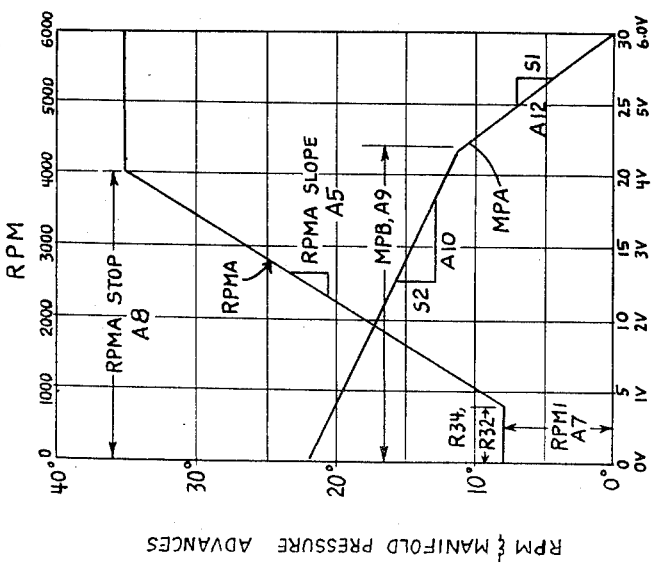
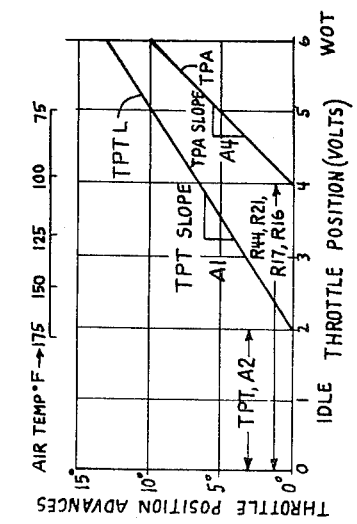
Fig. 14. CONTROLLER TIMING CHARACTERISTICS

ELECTRONIC ENGINE CONTROL

This is a division of U.S. patent application Ser. No. 899,355, filed Apr. 24, 1978, now U.S. Pat. No. 4,284,053, issued Aug. 18, 1981.

This invention relates to engine controls and more particularly to the control of fuel flow and ignition timing in connection with a spark ignited internal combustion engine. Still more specifically, this invention relates to the control of fuel flow and spark advance in response to a number of sensed engine conditions.

It is well known to control fuel flow in an internal combustion engine, especially to maintain an appropriate air/fuel ratio, as is disclosed in Priegel U.S. Pat. No. 3,817,225 issued June 18, 1974 for "Electronic Carburetion System for Low Exhaust Emissions of Internal Combustion Engines." Priegel discloses a system wherein the rate of air flow and certain other parameters are measured and used to control the drive of a positive displacement metering pump to supply fuel at an appropriate air/fuel ratio.

In such systems it is known to use an air flow transducer like that disclosed in Chapin U.S. patent application Ser. No. 783,612, filed Apr. 1, 1977 for "Air Flow Transducer," now U.S. Pat. No. 4,089,215, issued May 16, 1978. The air flow as detected by such transducer is used in connection with an electronic control system for controlling the flow of fuel to maintain an appropriate air/fuel ratio. In connection with such control it is known to utilize a fuel supply system as disclosed in Chapin and Merrick U.S. patent application Ser. No. 783,610, filed Apr. 1, 1977 for "Fuel System with Metering Pump for Internal Combustion Engines," now U.S. Pat. No. 4,112,901, issued Sept. 12, 1978. It is also known to utilize such fuel supply systems to supply fuel to a carburetor like that shown in Chapin U.S. patent application Ser. No. 783,611, filed Apr. 1, 1977 for "Carburetor with Hollow Air Control Valve," now U.S. Pat. No. 4,087,491, issued May 2, 1978. The present invention is directed to an improved electronic controller, particularly one that may be used with the air flow transducer of Application Ser. No. 783,612 for controlling a fuel supply system like that disclosed in Application Ser. No. 783,610.

The controller of the present invention is responsive not only to rate of air flow and rate of fuel flow, but also to barometric pressure, manifold pressure, air temperature, throttle position, fuel temperature, engine temperature, the use of accessories, start condition, and engine position (and hence, indirectly, engine speed) for supplying fuel at an appropriate rate. It is well known to utilize microprocessors or computers responsive to various engine conditions to provide fuel control. One such system is shown in Moyer et al. U.S. Pat. No. 3,969,614, issued July 13, 1976 for "Method and Apparatus for Engine Control."

The present invention also utilizes the electronic controller for controlling ignition timing. Conventionally, centrifugal means dependent upon engine speed and means responsive to manifold vacuum have been used to advance the spark. Comparable spark advance has been achieved electronically. One such electronic controller is disclosed in the aforesaid Moyer et al. U.S. Pat. No. 3,969,614. Another timing control is shown in Crall et al. U.S. Pat. No. 3,978,833 issued Sept. 7, 1976 for "Engine Control Circuit for Providing a Programmed Control Function."

Like the present invention, certain of the controllers of the prior art have been used to provide what might be called the "best" performance. However, what is best depends upon a number of competing factors, such as economy, ecology and drivability, the latter two being particularly subjective. In any event, in accordance with the present invention fuel flow and ignition timing are controlled in a manner to provide different relationships to the engine conditions than have been found in the controls of the prior art.

Thus, the primary object of the present invention is to provide an improved electronic control of fuel flow and ignition timing as to optimize fuel economy, exhaust emission, drivability, and more particularly the relationships among the three. More specific objects and advantages of the present invention will become apparent from consideration of the following detailed description, particularly when taken in connection with the appended drawings in which:

FIG. 5 is a schematic diagram of a speed-up circuit 5 for correcting the mass flow signal from the mass flow converter 4 for inertia lag;

FIG. 6 is a schematic diagram of an accelerator pump circuit 6 for providing additional fuel flow upon acceleration in the controller 2;

Figure 8:
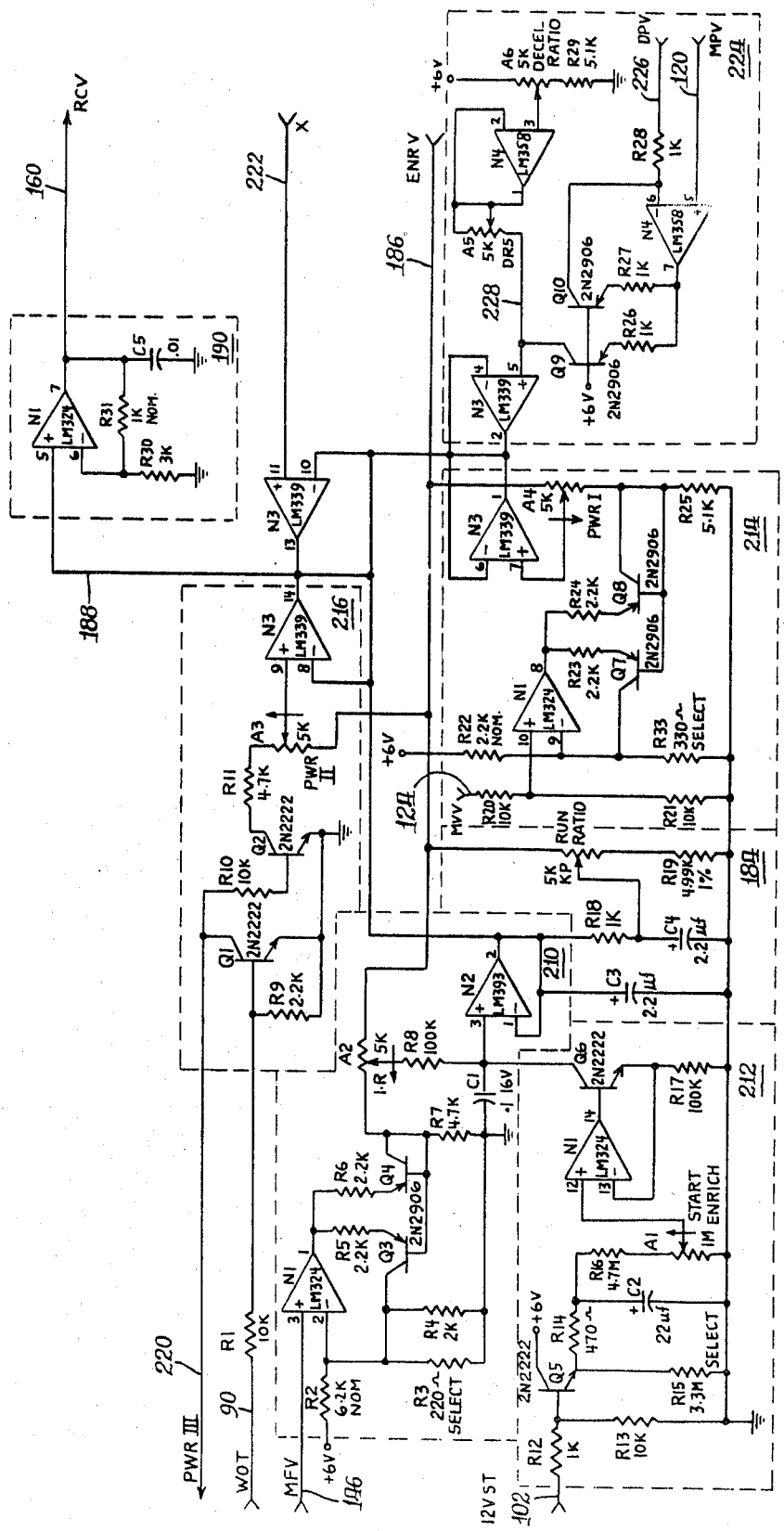
Figure 9:
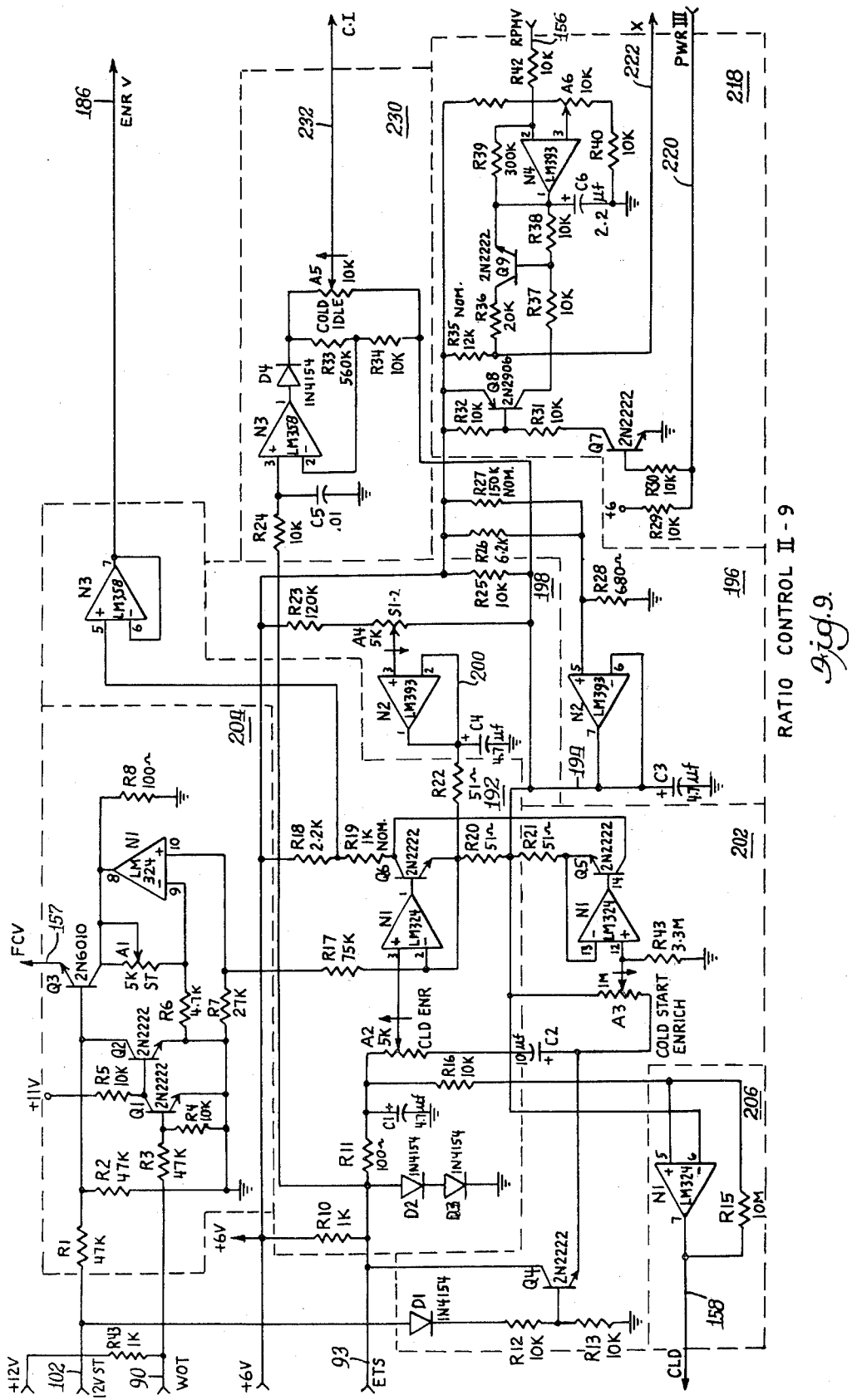
Figure 10:
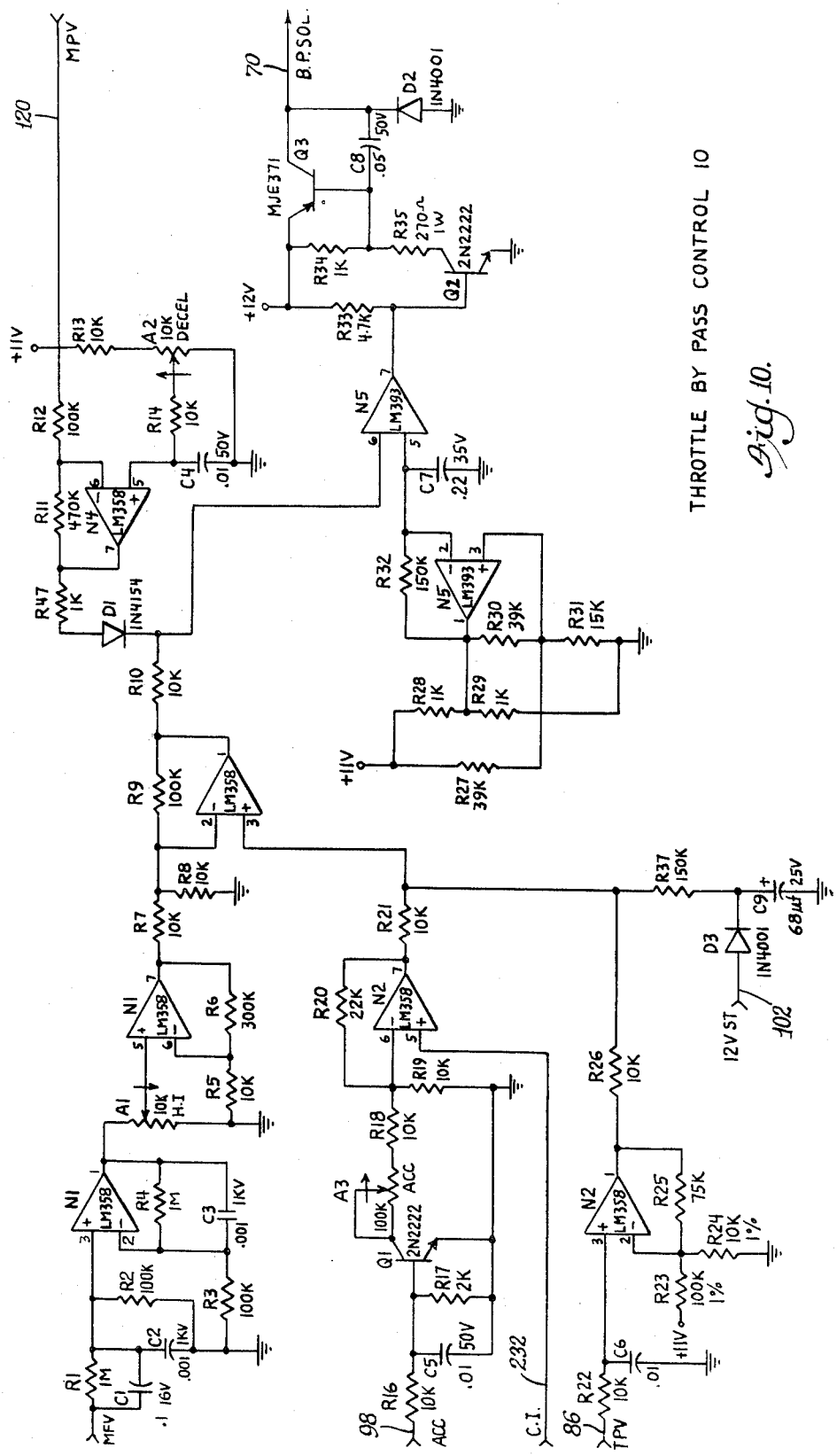
Figure 11:
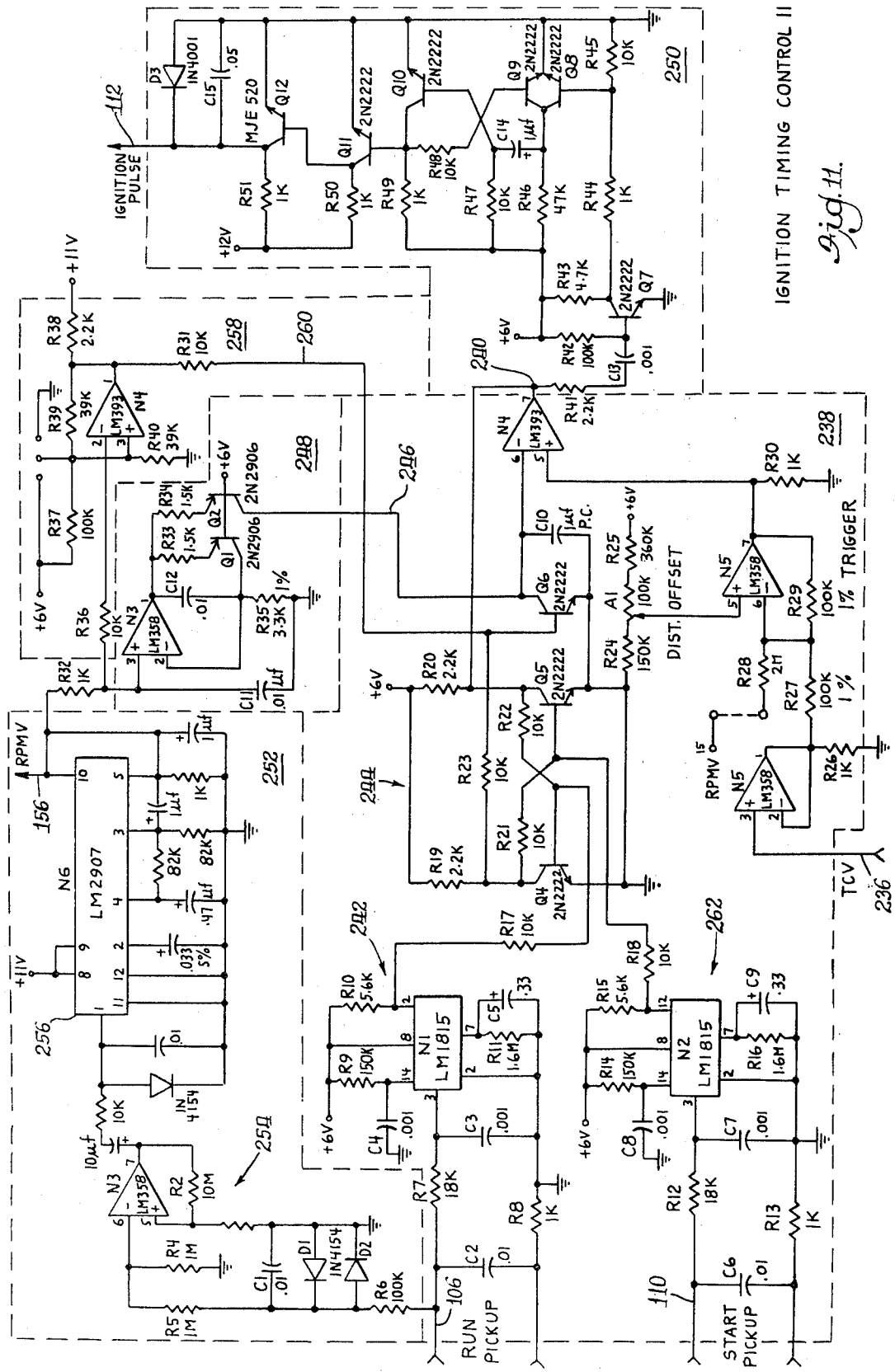
Figure 12:
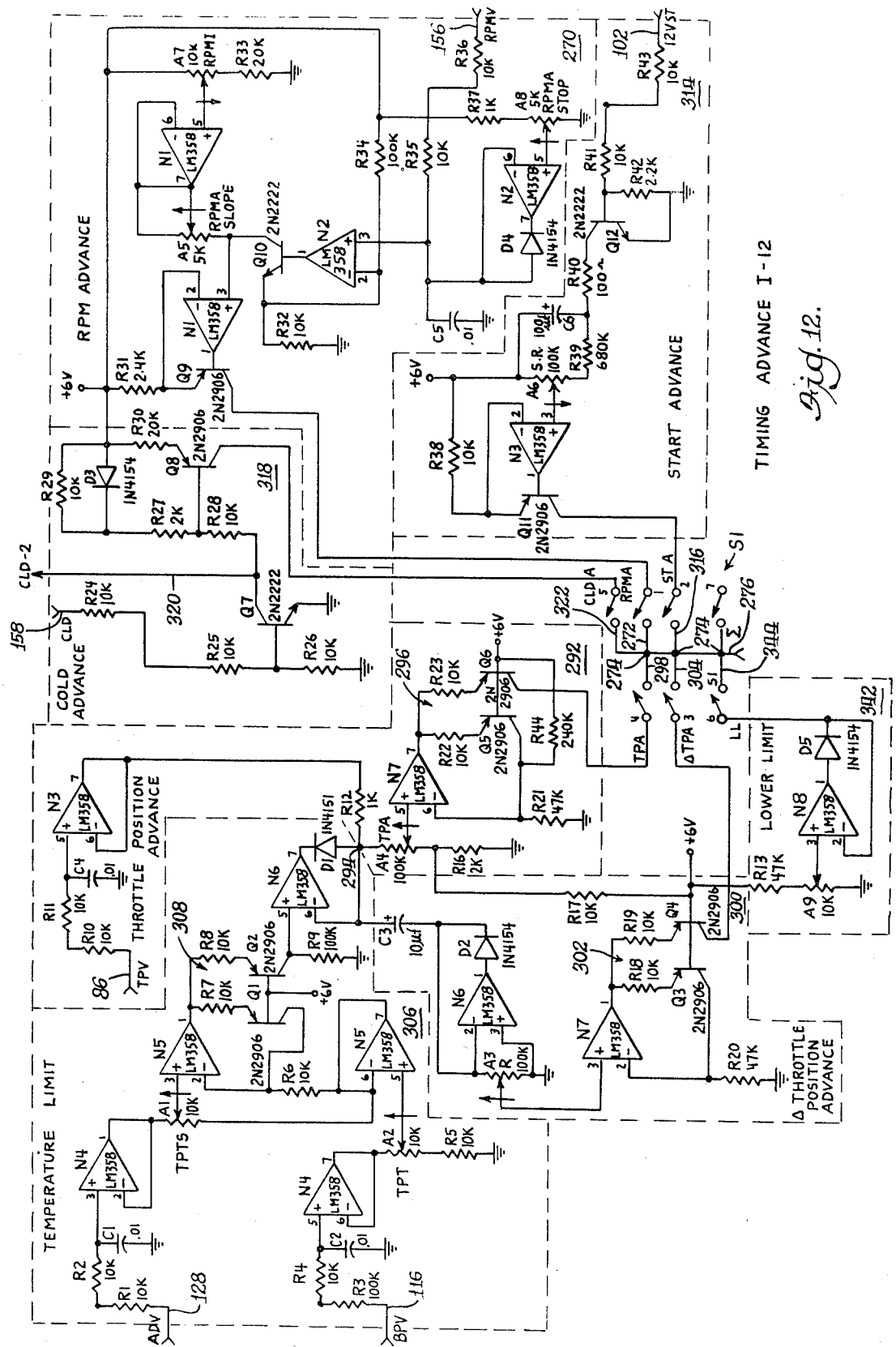
Figure 13:
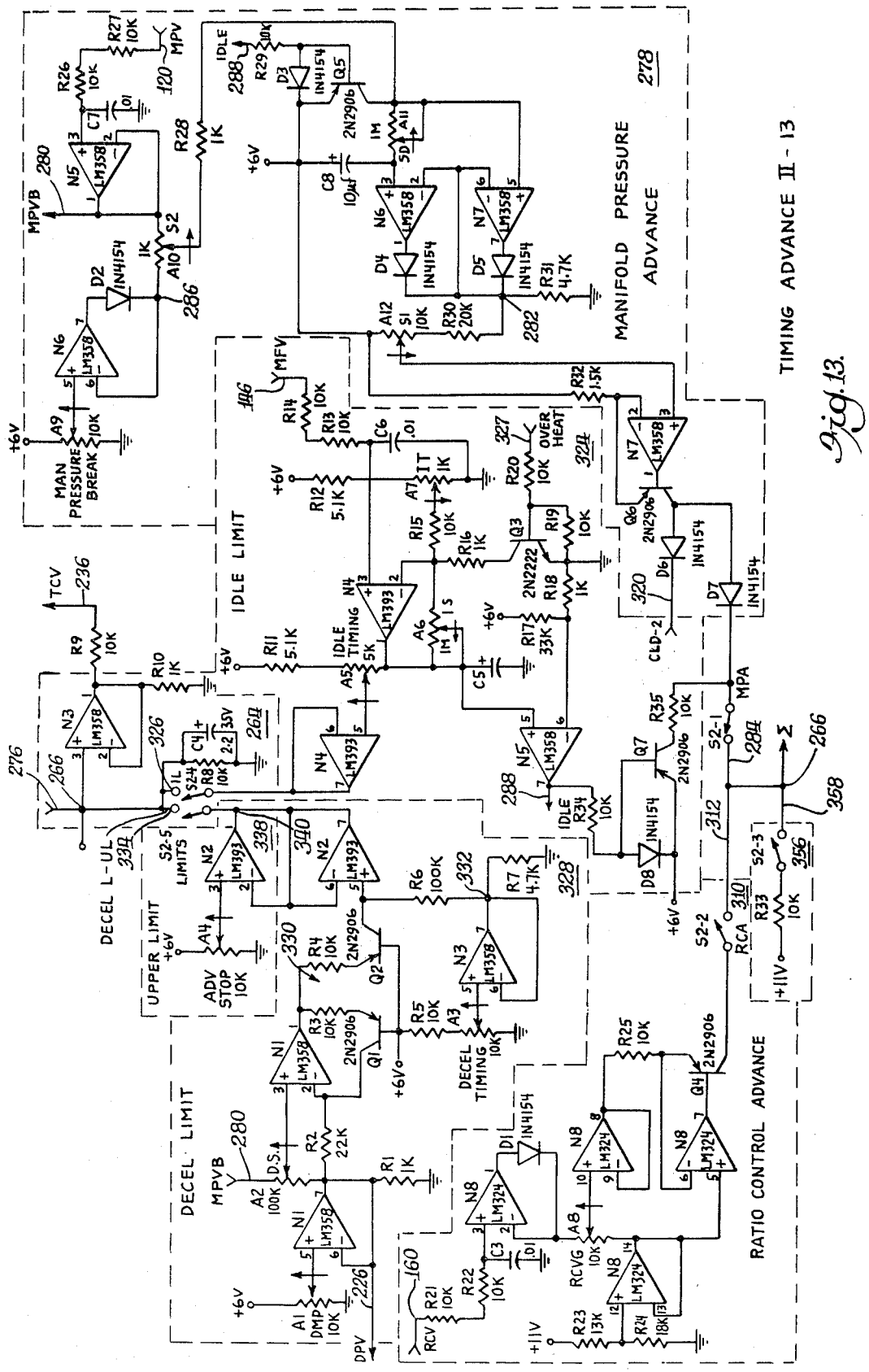

FIGS. 8 and 9 are schematic diagrams of respective parts I and II of ratio control circuitry 8 and 9 for providing a ratio control signal for determining the air/fuel ratio to be maintained by the pump driver circuitry 7;

FIG. 10 is a schematic diagram of throttle bypass control circuitry 10 in the controller 2;

FIG. 11 is a schematic diagram of the ignition timing control circuit 11 in the controller 2;

FIGS. 12 and 13 are schematic diagrams of respective parts I and II of timing advance circuitry 12 and 13 for providing a timing advance control signal to the timing control circuit 11; and FIGS. 14A–E are a graphical illustration of the respective timing advance control characteristics provided by the timing advance circuitry 12 and 13.

Figure 1:
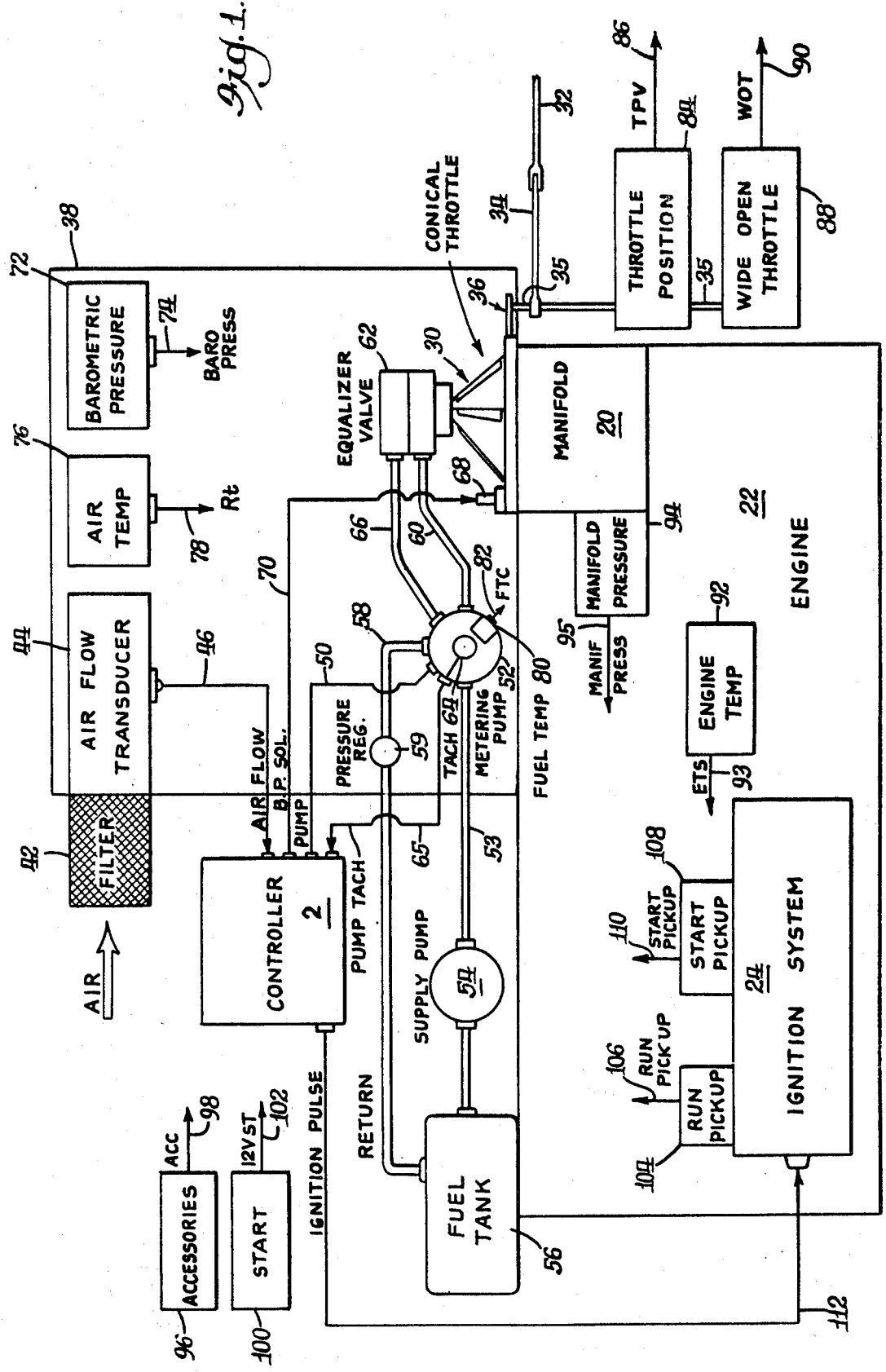
FIG. 1 is a diagrammatic illustration of a controlled air/fuel system and ignition timing system for an internal combustion engine utilizing the controller of the present invention.

The present invention is useful in internal combustion engines having air/fuel control systems wherein fuel is supplied in metered amounts providing a particular desired ratio of air to fuel for engine operation. In such systems, air flow to the intake manifold of the engine is controlled and measured, and air flow rate, usually in conjunction with other parameters, is used to develop a control signal used for providing fuel at the desired air/fuel ratio. In FIG. 1 there is illustrated very generally a control system for supplying an appropriate mixture of air and fuel to the intake manifold 20 of an internal combustion engine 22 and for supplying ignition sparks at appropriate times to the respective combustion chambers of the engine 22. The engine 22 may be a multi-cylinder spark-ignited reciprocating engine, specifically one burning gasoline. The engine 22 may have a conventional ignition system 24 which includes the usual spark coil, spark plugs, distributor and associated components.

The system of FIG. 1 includes a carburetor 30 which, as shown, is preferably conical. As a principal function of the carburetor 30 is to control the rate of flow of air to an intake manifold of an engine, the conical carburetor 30 is sometimes referred to as a conical throttle. The opening of the conical throttle 30 is controlled by a throttle rod 32 which may be connected, for example, to a conventional automobile accelerator pedal. The throttle rod 32 may be connected through a crank 34, a shaft 35 and gears 36 to control the throttle opening and hence the rate of flow of air into the intake manifold 20. As this is the principal air flow and as the throttle 30 is the throttle by which the operator controls engine speed, the throttle 30 may also be referred to as the main throttle. The throttle 30 is enclosed in a housing 38 which fits over the intake manifold 20 of the internal combustion engine 22. The throttle control linkage passes through the housing 38 at the shaft 35. The conical throttle 30 and its manner of operation may be as described in the aforesaid patent application Ser. No. 783,611.

All air flowing into the intake manifold flows through the housing 38, flowing into the housing through a filter 42 and an air flow transducer 44. The air flow transducer 44 measures the rate of air flow into, and hence out of, the housing 38 by producing a systematically related electrical signal AIR FLOW on a conductor 46 which goes to the controller 2. More particularly, the air flow transducer 44 and its manner of operation may be as described in the aforesaid patent application Ser. No. 783,612. Such transducer comprises a rotor driven by the entering air to produce a signal AIR FLOW formed as pulses occurring at a rate indicative of volumetric rate of air flow. The controller 2 receives other signals from other sensors, as described below and utilizes the various signals to provide appropriate fuel pump power PUMP on a conductor 50 to a metering pump 52.

The metering pump 52 is supplied with fuel through a conduit 53 by a supply pump 54 from a fuel tank 56, with any excess fuel being returned to the fuel tank 56 through a return conduit 58. A pressure regulator valve 59 maintains a predetermined reference pressure at the intake of the metering pump 52. The metering pump 52 supplies fuel to the carburetor 30 through a conduit 60 and an equalizer valve 62. A feedback signal PUMP TACH indicative of pump speed is developed by a pump tachometer 64 coupled to the metering pump 52 to move therewith. The PUMP TACH signal in a series of periodic pulses occurring at a rate proportional to pump speed. The metering pump 42 is a positive displacement pump so that the PUMP TACH signal is indicative of rate of fuel flow. The PUMP TACH signal is fed back over a conductor 65 to the controller 2 which utilizes the feedback signal to assure that the metering pump 52 operate at the desired speed. Reference pressure is applied to the equalizer valve 62 through a conduit 66. Such fuel supply system and its manner of operation may be as described in the aforesaid patent application Ser. No. 783,610.

Also illustrated generally in FIG. 1 is a bypass throttle 68 which operates as an auxiliary air control for admitting a controlled additional amount of air into the intake manifold 20, as may be called for by a signal B.P. SOL developed in the controller 2 and applied to the bypass throttle 68 over a conductor 70, as described in greater detail in Chapin and Merrick U.S. patent application Ser. No. 783,614, filed Apr. 1, 1977 for "Modulated Throttle Bypass," now U.S. Pat. No. 4,108,127, issued Aug. 22, 1978.

Reference will now be made to the other sensors illustrated in FIG. 1. A barometric pressure transducer 72 is disposed within the housing 38 and measures the ambient air pressure by producing an output signal BARO PRESS indicative of barometric pressure transmitted to the controller 2 over a conductor 74.

An air temperature sensor 76 is also disposed within the housing 38 to measure ambient air temperature. Such sensor may provide an output signal Rt in the form of a resistance magnitude dependent upon temperature. The output signal is coupled to the controller 48 over a conductor 78.

Fuel temperature is sensed by a fuel temperature sensor 80 disposed within the metering pump 52. The fuel temperature sensor may comprise a temperature sensitive diode which produces a fuel temperature signal FTC on a conductor 82 connected to the controller 2.

A throttle position sensor 84 is coupled to the shaft 35 and produces a throttle position signal TPV on a conductor 86 extending to the controller 2. The throttle position sensor may comprise a transformer with a movable core and a split secondary winding. The core is moved by the shaft 35 to produce an imbalance in the secondary winding. The imbalance is then detected by a conventional circuit which produces an analog signal TPV indicative of throttle position.

A wide open throttle sensor 88 is also coupled to the shaft 35. The wide open throttle sensor may be in the form of a limit switch which is closed when the throttle is moved to its extreme wide open condition. The closing of the switch applies a signal WOT to a conductor 90 connected to the controller 2. For the controller 2 described below, the signal WOT indicative of wide open throttle is a ground condition, the conductor 90 being otherwise at a positive potential.

An engine temperature sensor 92 may comprise a temperature sensitive diode disposed in the engine coolant. This transducer produces an engine temperature signal ETS on a conductor 93 connected to the controller 3.

Manifold pressure is sensed by a manifold pressure sensor 94 coupled to the manifold 20. The manifold pressure sensor 94 may operate in the fashion of the barometric pressure sensor 72 to provide a manifold pressure signal MANIF PRESS on a conductor 95 connected to the controller 2.

An accessories sensor 96 may be used to indicate whether or not certain accessories are being used as may load the engine, most notably an air conditioner. The detector may comprise a connection to the switch turning the air conditioner on and thus apply an appropriate signal ACC to a conductor 98 connected to the controller 2.

Similarly, a start condition may be sensed by a start sensor 100 which may comprise a connection to the switch starting the starting motor and thus develop a signal 12V ST on a conductor 102 connected to the controller 2.

In order to determine the speed and position of the engine, a run pickup 104 is coupled to the distributor of the ignition system 24. The run pickup 104 may comprise an electromagnetic pickup sensing the interruption of a magnetic field at a particular time in the distributor cycle, such as for example, 60° before top dead center for each cylinder. An output signal RUN PICKUP in the form of periodic pulses is applied over a conductor 106 to the controller 2 where it may be used to develop a signal indicative of engine speed. The signal may also be used in timing. Similarly, a start pickup 108 may be used to develop a signal START PICKUP useful in providing timing during a starting condition. Such signal may, for example, produce a pulse at 10° before top dead center over a conductor 110 connected to the controller 2.

To complete the description of the system illustrated in FIG. 1, the controller 2 produces a timing signal IGNITION PULSE in response to the sensed conditions and applies this signal over a conductor 112 to the ignition system 24.

It should be noted that each of the conductors referred to that are shown as single lines in FIG. 1 may in fact comprise a pair or more of conductors to provide the necessary paths for completion of the respective signal circuits. The completion of the conductors to the controller 2 are not all shown in order to avoid the confusion of multiple lines. In point of fact, each of the arrowheads extending from the respective sensors indicates the connection of the respective conductor to the controller 2. Similarly, in the remaining figures the respective conductors are shown at the input to the controller 2. Where the same signal is applied to different parts of the controller, the same number will be used to identify collectively the conductors over which the signal is applied.

Figure 2:
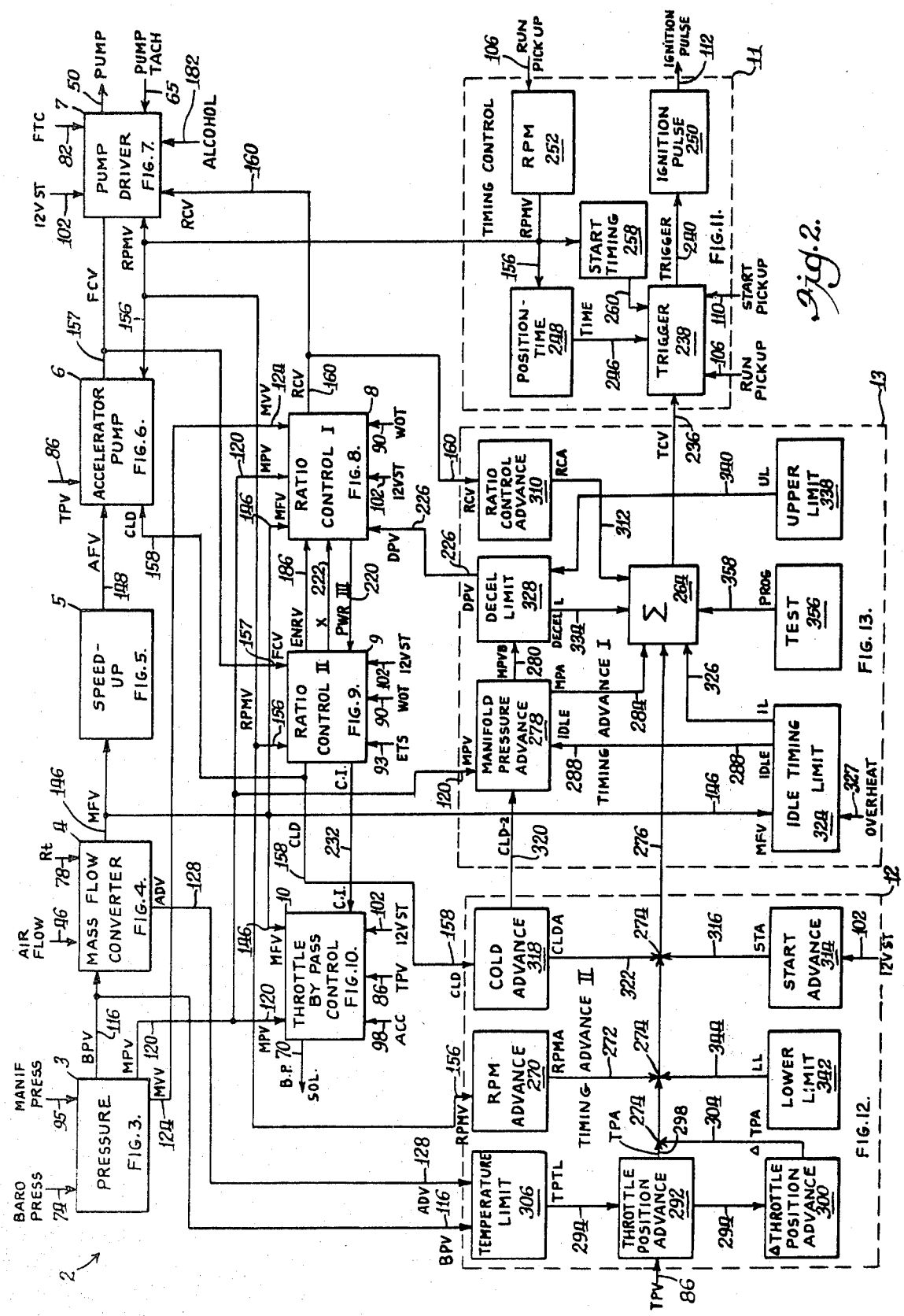
FIG. 2 is a diagrammatic illustration of a preferred form of the controller 2 of the present invention showing the relationships among the respective control circuits.

FIG. 2 is a diagrammatic illustration of the entire controller 2 showing the connections from the respective sensors and showing the interconnections between the various component circuits illustrated in FIGS. 3 through 14.

Figure 3:
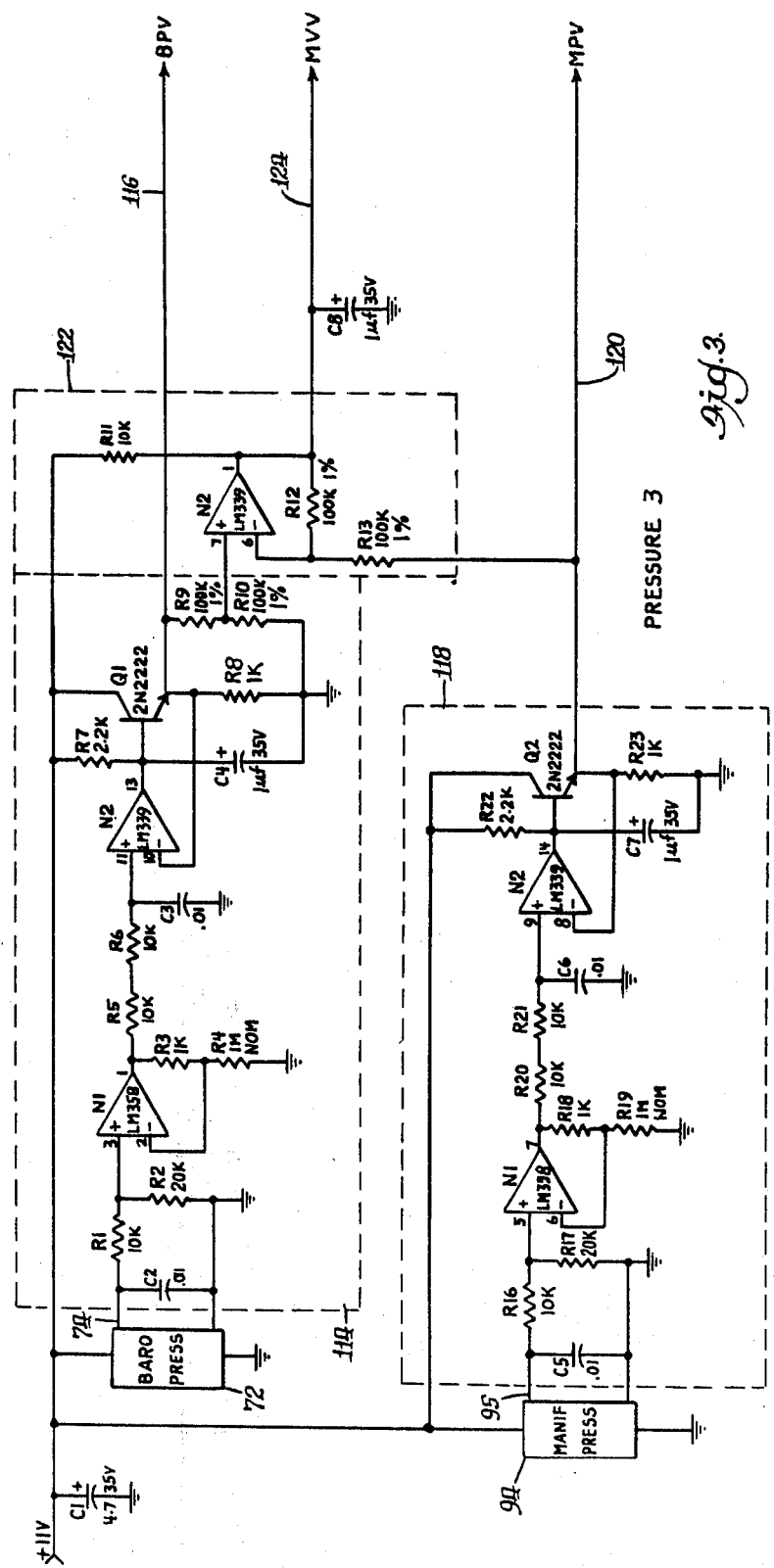
FIG. 3 is a schematic diagram of the present signal circuits 3 of the controller 2.

In FIG. 3 are illustrated the pressure circuits 3. These circuits include a barometric pressure circuit 114 which receives the barometric pressure signal BARO PRESS from the barometric pressure transducer 72 over the conductor 74 and produces on a conductor 116 an analog signal BPV systematically relates to barometric pressure. The barometric pressure circuit 114 is essentially an amplifier with an output circuit to provide a signal of appropriate magnitude at an appropriate impedance level. Similarly, a manifold pressure circuit 118 receives the manifold pressure signal MANIF PRESS from the transducer 94 over a conductor 95 and produces a systematically related manifold pressure signal MPV, an analog signal corresponding to the manifold pressure. The signal MPV is applied to a conductor 120. The pressure circuits 3 also include a manifold vacuum circuit 122 which is essentially a subtraction circuit providing a manifold vacuum signal MVV on a conductor 124 that is the difference between the barometric pressure signal BPV and the manifold pressure signal MPV. The signal MVV is therefore indicative of the magnitude of the vacuum in the manifold, that is, the negative pressure below barometric that exists in the intake manifold 20.

Figure 4:
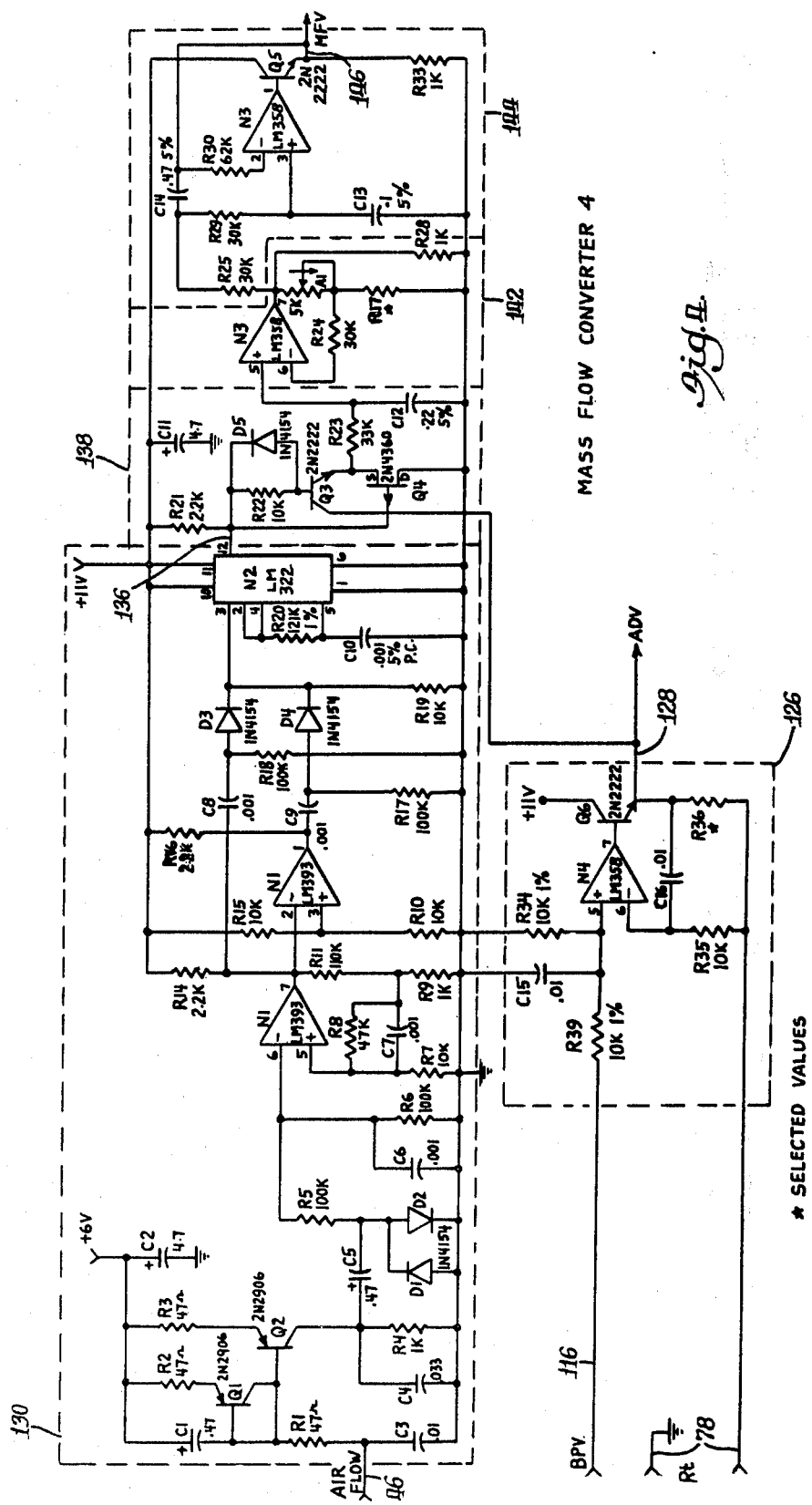
FIG. 4 is a schematic diagram of a mass flow converter 4 for combining the air flow signal, the barometric pressure signal and the air temperature signal to provide a measure of mass flow in the controller 2.

The mass flow converter 4, as shown in FIG. 4, combines the barometric pressure signal BPV with the air temperature signal Rt to produce a signal ADV indicative of air density and utilizes this signal to modify the air flow signal AIR FLOW, which is indicative of volumetric rate of flow of air, to produce a signal MFV indicative of mass rate of flow of air.

As shown in FIG. 4, the mass flow converter 4 includes a multiplier circuit 126 to which the barometric pressure signal BPV is applied on the conductor 116 and the air temperature signal Rt is applied over the conductor 78, or in this instance, more properly between conductors 78, one of which is grounded. The signal BPV is applied to the + terminal of an amplifier N4-5, 6, 7 through a resistor R39. Resistors R39 and R34 form a voltage divider placing the signal at the + terminal in the appropriate scale range. The output of the amplifier N4-5, 6, 7 at pin 7 is applied through a transistor Q6 to an output conductor 128. A resistor R36 and the resistance Rt representing air temperature form a voltage divider providing the input to the − terminal of the amplifier N4-5, 6, 7 through a resistor R35. The air temperature sensor 76 has a negative temperature coefficient of resistance, whereby the resistance of the air temperature signal Rt increases as temperature goes down. This, thus, introduces a multiplying factor into the amplifier N4-5, 6, 7, causing the output on the conductor 128 to go up as temperature goes down. This, of course, is the relationship between air density and temperature, and the output signal ADV on the conductor 128 is thus representative of air density provided that various circuit elements are of the appropriate magnitude. More particularly, the resistance of the resistor R36 is selected relative to the resistance of Rt, the resistance of the air temperature sensor 76, to make the response approximately linear over the desired range. For example, the resistance of the resistor R26 may be made equal to the resistance of the signal Rt at 25° C.

As shown in FIG. 4, the mass flow converter 4 includes a signal conditioning circuit 130 which receives the air flow signal AIR FLOW on the conductor 46. The air flow signal AIR FLOW is typically in the form of periodic pulses having positive and negative components occasioned by the building up and collasping of the magnetic field in the air flow detector. The signal conditioning circuit 130 operates to convert the input signals into a series of corresponding pulses of uniform magnitude and duration. More particularly, transistors Q1 and Q2 cause a signal to be developed across a resistor R4 that corresponds to the air flow signal AIR FLOW. The AC component of this signal is applied through a capacitor C5 and a resistor R5 to a Schmitt trigger circuit that produces corresponding square wave pulses at N1-7. These square wave pulses are applied to pin 3 of a one-shot multivibrator N2. At the same time the pulses are inverted by an inverter N1-1, 2, 3 and applied to the same pin 3. This amounts to doubling the number of triggering pulses applied to the multivibrator N2. The multivibrator N2 thus produces output pulses of uniform duration and magnitude at pin 12 which pulses are at twice the frequency of the input pulses at the conductor 46. These pulses are thus at a frequency corresponding to volumetric rate of air flow.

The multivibrator output pulses are applied over a conductor 136 to a multiplying circuit 138. These pulses act to turn on a transistor Q3 and turn off a transistor Q4 for the duration of each pulse. Thus, during each pulse the air density signal ADV is applied through the transistor Q3 to charge a capacitor C2 through a resistor R23. When the pulse is off, the transistor Q3 is non-conductive, and the transistor Q4 conducts, permitting the capacitor C12 to discharge through the resistor R23. The resistor R23 and capacitor C12 thus act as an integrating circuit, the average voltage developed on the capacitor C12 being proportional to the magnitude of the air density signal ADV times the proportional of time that the capacitor is charged by virtue of the pulses from the multivibrator N2. That is, the integrated value is the product of pulse width, pulse height and pulse rate, pulse width being the duration of the multivibrator pulse (a constant), pulse height being proportional to the air density, and pulse rate being proportional to the rate of occurrence of the multivibrator pulses which is in turn proportional to volumetric rate of air flow. Thus, the signal developed on the capacitor C12 is proportional to the product of air density and the volumetric rate of air flow. As density times volume is mass, the integrated signal is thus proportional to mass rate of flow. The integrated signal is applied to an amplifier 142 wherein a potentiometer A1 adjusts the factor of proportionality. The amplifier output is applied through a filter 144 to develop on a conductor 146 a corresponding signal MFV corresponding to the mass rate of flow of air.

The signal MFV indicative of mass rate of flow is applied to the speed-up circuit 5 which acts to overcome the sluggishness of the air flow transducer 44. In this case, the speed-up circuit 5 essentially takes the derivative of the applied signal MFV, and after a gain adjustment effected by a potentiometer A4, the derivative is added to the signal MFV at a terminal N3-10. The combined signal is then amplified and appears at the terminal N3-8 as a signal AFV which represents a compensated mass rate of air flow signal more accurately representative of the true mass rate of flow. That is, the mass rate of air flow as measured is necessarily a delayed measurement because the inertia of the measuring instrument precludes its instantaneous response to the changes in rate of air flow through the transducer and coupling of the transducer to the air flow is imperfect. The speed-up circuit 5 notes a change in rate of flow by noting the magnitude of the derivative or rate of change of the mass flow signal MFV. When there is a relatively fast rate of change, this indicates that where will be substantially further future change, until the transducer reaches its stable condition truly indicative of rate of air flow. Thus, by adding a signal related to the rate of change either positively or negatively, the combined air flow signal AFV is more representative of the stable condition and hence more representative of the true rate of air flow.

In the circuit illustrated, the mass flow signal MFV is applied across a voltage divider formed by resistors R42 and R43. The portion of the signal appearing across the resistor R43 is applied to an amplifier N3-5, 6, 7 to control a transistor Q13 to provide current flow through the transistor Q13 as to maintain the voltage drop across a resistor R44 equal to that across the resistor R43. This current flows through a diode string D10-D11-D12-D13. This causes a potential drop across the diode string that varies with current flow, but non-linearly as diode impedance varies inversely with current. For this reason changes in the mass flow signal MFV make smaller changes in the voltage drop across the diode string when the mass flow signal is higher. The change in signal across the diode string is applied through a capacitor C21 and amplified by an amplifier N3-12, 13, 14 to produce a signal at the terminal N3-14 proportional to the change in potential across the diode string. A potentiometer A4 and a resistor R53 are connected in series from the terminal N3-14 and the 6-volt power supply. The 6 volt supply permits positive and negative swings to the differential signal. The setting of the potentiometer A4 determines the gain of the amplifier N3-12, 13, 14. The differential signal at the terminal N3-14 is applied through a resistor R52 to add to the mass flow signal MFV. The summed signals are applied through an amplifier N3-8, 9, 10 to produce compensated air flow signal AFV on a conductor 148. The 6-volt supply is connected to the input terminal N3-9 through a resistor R55 and a potentiometer A5 to offset the effect of the connection of the 6 volt power supply to the amplifier N3-12, 13, 14.

The effect of the non-linear current-voltage characteristic of the diodes D10-D11-D12-D13 is to reduce the effect of the speed-up circuit 5 at high rates of air flow where the air flow transducer 44 is better coupled to the air stream than at low rates of flow. Thus, a step function at high rates of flow, as indicated by a high mass flow signal MFV, makes a relatively small change in the compensation signal as developed at the terminal N3-14. This makes the compensation greatest where it is most needed.

The 11 volt power supply is momentarily applied through a capacitor C19 when the controller 2 is first turned on. This momentarily causes a transistor Q4 to conduct to disable the speed-up circuit 5 at the start.

It is well known that a gasoline engine functions better upon accelerating if the air-fuel mixture is enriched. It is therefore conventional to provide an accelerator pump operating upon depression of the accelerator pedal to squirt a small additional amount of gasoline into the carburetor upon change of accelerator pedal position in the direction of further opening of the throttle. This function is achieved in the present invention by operation of the accelerator pump circuit 6 illustrated in FIG. 6. The throttle position signal TPV is applied over the conductor 86 to the accelerator pump circuit 6. The pump circuit 6 comprises a long time constant pump circuit 150 and a short time constant pump circuit 152. In the long time constant pump circuit 150, any change in throttle position signal TPV charges capacitors C12 and C13 which are then discharged through a potentiometer A1 connected as a variable resistor and a resistor R18, with a time constant determined by the position of the potentiometer A1. A portion of this signal is picked off a potentiometer A2 which determines the amplitude of the signal. This signal is amplified by an amplifier N2-5, 6, 7 to produce at a resistor R26 a signal of amplitude dependent upon the change in throttle position signal TPV with a time constant dependent upon the setting of the potentiometer A1. An amplifier N2-1, 2, 3 is connected to assure that the signal not go negative. A transistor Q2 and the connections thereto, particularly the voltage momentarily applied through a capacitor C14 when the system is first turned on, disables the circuit momentarily to give time for the capacitors C12 and C13 to become charged initially by the throttle position signal TPV.

An RPM limit circuit 154 acts to limit the amplitude of the output signal from the long time constant pump circuit 150 to an upper limit dependent upon the engine speed. As will be described in greater detail in connection with FIG. 11, a signal RPMV indicative of engine speed is developed on a conductor 156 in response to the run pickup signal RUN PICKUP applied over the conductor 106 from the run pickup sensor 104. The RPM limit circuit 154 assures that the signal at N2-13 not rise above the engine speed signal RPMV. This provides an upper limit to the amplitude of the signal developed on the capacitors C12 and C13 and limits the amplitude to a smaller voltage at lower speeds.

The short time constant accelerator pump circuit 152 is similar to the pump circuit 150 except that it operates with a shorter time constant as determined by the setting of a potentiometer A7 and provides a signal of different amplitude as determined by the setting of a potentiometer A6. The output of the short time constant accelerator pump circuit 152 is applied through a resistor R27 to a summing amplifier N4-5, 6, 7 to which the output of the long time constant accelerator pump circuit 150 is also applied. The outputs of the long time constant accelerator pump circuit 150 and the short time constant accelerator pump circuit 152 are summed in the summing amplifier N4-5, 6, 7, and the summed output is added to the compensated mass air flow signal AFV applied over the conductor 148 through a summing resistor R37. These signals are summed in a summing amplifier N4-1, 2, 3, and the summed output is applied through a resistor R41 to an output conductor 157 as the fuel control signal FCV.

A transistor Q1 responds to negative signals applied to the capacitors C12 and C13 by grounding the fuel control signal FCV in the event of negative accelerator motion, that is, when the accelerator pedal is lifted. This reduces the fuel flow more than would normally be the case upon raising the accelerator pedal and acts to dispose of excess fuel already in the fuel system. This eliminates a so-called CO spike in the exhaust emissions. Such spike is occasioned by the fact that the fuel feed system contains some fuel accumulated in the system following the metering fuel pump. This fuel is in excess of the desirable amount for proper burning of the fuel when the throttle is being closed, reducing the amount of air. To offset this somewhat and to reduce the excess fuel promptly, the fuel control signal FCV is momentarily depressed.

An amplifier N4-12, 13, 14 and a diode D5 keep the output of the short time constant pump circuit 152 from going negative.

It has been discovered that cold engines will run more smoothly upon sudden accelerations if more fuel is added by the accelerator pump action than would be desirable when the engine is hot. A signal CLD indicative of a cold engine is applied to the accelerator pump circuits 6 over a conductor 158. As will be described in greater detail below, the cold signal CLD is derived from the engine temperature signal ETS applied to the controller 2 on the conductor 93. In the accelerator pump circuit 6, the cold signal CLD is applied to a transistor Q3 to change the gain of the long time constant accelerator pump circuit 150 to increase the gain when the engine is cold.

Figure 7:
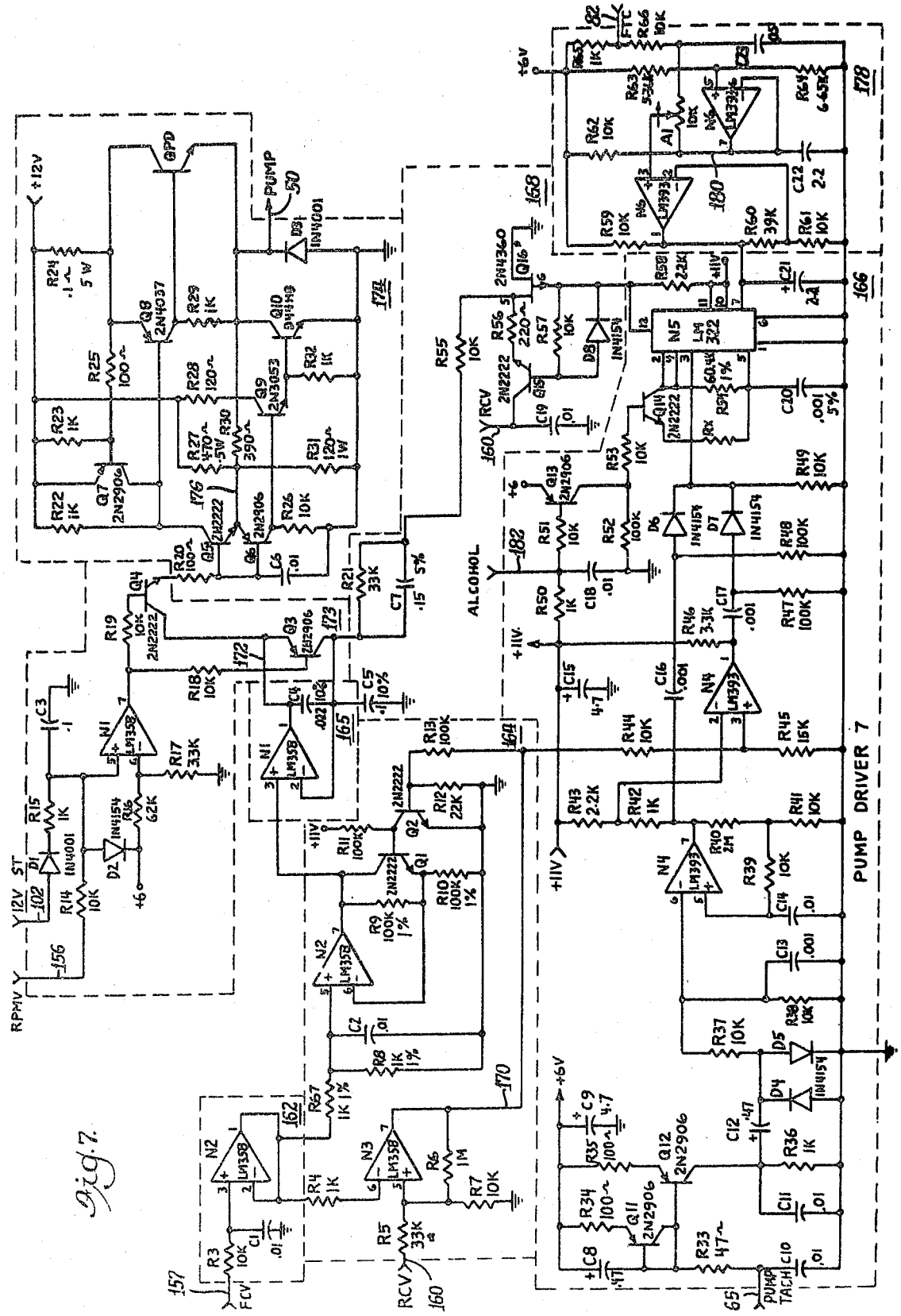
FIG. 7 is a schematic diagram of pump driver circuitry 7 of the controller 2 for driving a metering pump providing fuel for the engine in response to a signal dependent upon air flow.

The fuel control signal FCV is in a sense the primary control voltage for the pump driver circuit 7. As shown in FIG. 7, the pump driver circuit 7 is essentially a circuit wherein the fuel control signal FCV applied on the conductor 157 is compared to the pump speed signal PUMP TACH applied on the conductor 65, and the metering pump 52 is driven at such speed by the power applied at the conductor 50 as to place the fuel control signal and the pump speed signal in appropriate ratio as determined by a ratio control signal RCV applied on a conductor 160. The ratio control signal RCV is developed in the ratio control circuits 8 and 9 as illustrated in FIGS. 8 and 9 and discussed further below. Because the pump 52 is a positive displacement pump, pump speed is a measure of rate of flow of fuel. Thus, the pump driver circuit 7 causes the metering pump 50 to operate at such speed as to maintain the ratio of air flow (as indicated by the fuel control signal FCV) to fuel flow (as indicated by the PUMP TACH signal on the conductor 65) at the appropriate magnitude as demanded by the ratio control signal RCV on the conductor 160. Actually, of course, under conditions of acceleration the accelerator pump circuit 6 causes the fuel control signal FCV to be somewhat different from the actual air flow signal AFV. Even so, one may broadly construe the pump driver circuit 7 as maintaining fuel flow at an appropriate air/fuel ratio.

The fuel control signal FCV is applied on the conductor 157 through a follower circuit 162 and thence through a pump range extender circuit 164 to the + input terminal of a differential amplifier 165.

The pump speed signal PUMP TACH is applied over the conductor 65 to a signal conditioning circuit 166 which operates substantially like the signal conditioning circuit 130 described above in connection with FIG. 4. That is, the pump speed signal PUMP TACH is in much the same form as the air flow signal AIR FLOW and the signal conditioning circuit 166 operates to convert the input signals into a series of corresponding pulses of uniform magnitude and duration at the terminal 12 of a one-shot multivibrator N5. As before, the output pulse rate is twice the input pulse rate, at least under some conditions.

The output of the signal conditioning circuit 166 is applied to a multiplier circuit 168 which operates much like the multiplier circuit 138 described in connection with FIG. 4. In this case the other input is the ratio control signal RCV applied over the conductor 160. The output of the multiplier circuit 168 is by way of an integrating circuit comprising a resistor R21 and a capacitor C5 which operates to produce on the capacitor C5 a signal proportional to the produce of the ratio control voltage and the pump speed. This combined signal is applied to the − input terminal of the differential amplifier 165. The amplifier 165 thereupon acts to compare the fuel control signal FCV with the fraction of the fuel flow signal as demanded by the ratio control signal RCV.

The pump range extender circuit 164 is to permit erelatively accurate fuel metering over a relatively wide range of speeds. The control range is limited by the permissible length of output pulses from the multivibrator N5. If the pulses are very short, the signals are too small for accuracy. On the other hand, if the pulses are made relatively long, then the pump speed may be so great that the pulses occur so rapidly that the pulses actually overlap, making further control impossible as the signal can be no greater than fully on. To alleviate this difficulty, the pump range extender circuit 164 cuts the effective pulse rate in half at high metering pump speeds.

As shown in FIG. 7, the pump range extender circuit 164 receives the fuel control signal FCV from the follower circuit 162 and the ratio control signal RCV from the conductor 160. Effectively, a differential amplifier N3-5, 6, 7 compares the fuel control signal FCV with a portion of the ratio control signal RCV and develops a range control signal on a conductor 170 indicating which is the larger. As the ratio control signal RCV is a measure of the desired ratio between air flow (as represented by the fuel control signal FCV) and fuel flow (as indicated by the PUMP TACH signal), the ratio control signal is itself determinative of an air flow at which the pump speed exceeds some limit. That is, for any pump speed limit where it is desired to activate the pump range extender circuit 164, the ratio control signal RCV relates this limit to air flow. The relative resistances of resistors R5 and R7 set the corresponding air flow limit for switching in the range extender circuit 164. Thus, whenever the fuel control signal FCV is larger than the control level, as would indicate a demand for a relatively high pump speed, the range control signal is low, and whenever the fuel control signal is smaller, as would indicate a demand for a relatively low pump speed, the range control signal is high. The range control signal on the conductor 170 is applied to the inverter N4-1, 2, 3 to turn the inverter off when the range control signal is low. This halves the number of output pulses from the multivibrator N5, permitting twice as many pulses and hence twice the pump speed before the range of the multivibrator control is reached. This permits use of a longer period for the multivibrator and hence more accurate control at the lower speeds. The result of thus extending the range of the multivibrator is to reduce the output signal to the − terminal of the amplifier 165 by a factor of 2. To compensate for this, a high signal on the conductor 170 is applied through a transistor Q2 to turn on a transistor Q1 which acts to shunt a resistor R9 in a voltage divider comprising resistors R9 and R10 of equal resistance. This means that the shunting of the resistor R9 cuts in half the gain of an amplifier N2-5, 6, 7. Thus, the + input to the amplifier 165 is cut in half at the same time that the input to the − terminal is halved. The differential amplifier 165 thus produces a pump control signal on a conductor 172 indicative of whether the pump speed is above or below the desired speed. The pump control signal is applied through a switching circuit 173 to a power amplifier 174. This switching circuit 173 is normally in the condition wherein a transistor Q4 is on and a transistor Q3 is off. This couples the conductor 172 to the power amplifier 174. When the pump control signal on the conductor 172 is greater than a reference potential on a conductor 176, a transistor Q5 is turned on, which in turn turns on a transistor Q8, which in turn turns on a driving transistor QPD which supplies the driving current PUMP for the pump 52 over the conductor 50. The pump 52 is then driven to make it travel at such speed that the pump speed signal PUMP TACH produces a feedback signal at the − terminal of the differential amplifier 165 as equals the fuel control signal as applied to the + terminal. Because the pump 52 is positively driven, it is promptly speeded up when fuel demand increases to follow demand accurately.

Should the fuel demand decrease, it is important that the fuel flow be shut down promptly in order that the fuel flow may also accurately and quickly follow the fuel demand when it decreases. This is achieved by the application of the pump control signal on the conductor 172 to render conductive a transistor Q6 whenever the control signal drops below the reference potential on the conductor 176. Conduction by the transistor Q6 turns on transistors Q9 and Q10 which thereby shunts the pump circuit causing the motor to act as a generator and thereby remove energy from the motor. This acts as a dynamic brake, causing the motor to slow down more promptly than were it merely to coast.

The effect of fuel temperature has so far been ignored. As fuel expands with temperature, the mass of fuel indicated by the pump speed signal varies with the temperature of the fuel. That is, at cold temperatures, a greater mass of fuel will occupy the same space. Thus, a fuel density circuit 178 is utilized to correct the pump tachometer signal for changes in fuel density. The density is sensed by the fuel temperature sensor 80, which may be a diode having a negative temperature coefficient of resistance. This produces a fuel temperature signal FTC at the conductor 82 in the form of a resistance which rises as temperature goes down. A voltage divider comprising resistors R63 and R64 sets an operating level to match the resistance of the fuel temperature sensor at some nominal temperature, such as 25° C. This signal is applied through a follower circuit N6-5, 6, 7 to a conductor 180. This establishes the operating reference level. The gain of the circuit is determined by the setting of a potentiometer A1 connected between the conductor 180 and a resistor R66 connected to the conductor 82. The signal at the tap of the potentiometer A1 is the sum of the reference level and a portion of the signal developed across the fuel temperature sensor 80. It is thus a measure of fuel temperature. Such signal is applied to an amplifier N6-1, 2, 3, the output of which is applied to pin 7 of the multivibrator N5. This modifies the time constant of the multivibrator to provide longer pulses when the fuel is colder and hence more dense and shorter pulses when the fuel is warmer. This compensates for changes in the density of the fuel.

An optional feature is the connection of a transistor Q14 to N5-2 and 4 and the circuit for turning the transistor Q14 on. The transistor Q14 is turned on by a signal ALCOHOL applied to a conductor 182. When the transistor Q14 is turned on the time constant of the multivibrator is changed. This permits an alternative setup to the signal conditioning circuit 166 whereby pulses of different length may be produced when a different fuel is used, as for example, alcohol. Thus, when such fuel is used in lieu of the regular fuel, a signal may be applied to the conductor 182 to modify the time constant of the multivibrator N5 accordingly.

The purpose of the switching circuit 173 is to shut off the metering pump 52 when the engine is not running. More particularly, the circuit 173 is designed to turn off the pump 52 when the engine speed signal RPMV, as applied to the conductor 156, indicates that the engine is turning at less than idle speed and hence is not running. This acts to prevent flooding of the engine if the ignition switch is left on while the engine is stopped. The level indicative of idle is determined by the resistance of a resistor R17 connected in a voltage divider including a resistor R16. The engine speed signal is applied from the conductor 156 to the + terminal of a comparator N1-5, 6, 7. When this signal falls below the reference on the resistor R17, the output signal at N1-7 turns off the transistor Q4, thus turning off the power amplifier 174. At the same time, this signal turns on a transistor Q3 which thereby shortcircuits the output of the differential amplifier 165 to assure discharge of the output capacitor C4 when the engine is not running. This prevents accumulation of a charge on the capacitor C4 and hence the presence of a control signal demanding fuel at the time the transistor Q4 is first turned on. This prevents an undesirable transient upon starting.

In respect to starting, it is of course important to override the turning off of the transistor Q4 when one wishes to start the engine. This is achieved by applying the start signal 12V ST to the conductor 102 to override the engine speed signal RPMV at the input to the comparator N1-5, 6, 7 and thus assure turning on of the transistor Q4 and turning off of the transistor Q3 upon starting the engine.

The ratio control circuits 8 and 9 as shown in FIGS. 8 and 9, respectively, develop the signal RCV corresponding to a desired air to fuel ratio. There is circuitry for developing a basic run ratio signal for the normal steady state condition with various other circuits for making adjustments in such signal for various transient conditions such as to provide enrichment during idle, when starting, and when cold and for certain conditions where extra power is required for drivability irrespective of economy or ecology. Many of these adjustments are somewhat empirical, based upon a particular engine and the vehicle it is propelling. As indicated above, the circuitry is to provide suitable optimization of economy, ecology and drivability and suitable trade-offs among the three. In general, the circuit illustrated is suitable particularly for a socalled lean-burn engine. That is one in which the air to fuel ratio is well above the stoichiometric ratio, with substantially more air than is needed for combustion.

The basic run ratio is determined by a run ratio circuit 184 which is essentially a potentiometer connected between a conductor 186 and ground. The adjustment of a potentiometer KP determines the run ratio which may, for example, be set to be 20:1. The conductor 186 is at a reference potential of 6 volts under steady state conditions when the engine is hot. It is varied pursuant to a temperature control signal ENR V applied to the conductor 186 from circuitry shown in FIG. 9 and discussed further below. The signal picked off the potentiometer KP is applied through a resistor R18 to a conductor 188, whence it passes through a buffer amplifier 190 to become the ratio control signal RCV on the conductor 160.

Referring now to FIG. 9, the signal ENR V applied to the run ratio control circuit is developed by a cold enrichment circuit 192. The input to this cold enrichment circuit 192 is the engine temperature ETS applied to the conductor 93. This signal is basically a resistance signal created by the negative temperature coefficient of resistance of a diode comprising the temperature sensor 80 placed in the coolant of the engine. A voltage is developed on this sensor 80 by way of a 6-volt power supply and a resistor R10, the resistances of the sensor 80 and the resistor R10 forming a voltage divider. The resistor R10 determines the range of signal levels on the conductor 93 as the resistance of the sensor 80 changes with temperature.

Basically, the cold enrichment circuit 192 operates by comparison of the engine temperature signal ETS with a reference potential developed on a conductor 194. In the circuit illustrated in FIG. 9, this reference potential is 0.6 volts as developed by a reference potential circuit 196. When the signal ETS is below 0.6 volts, the engine may be considered to be warmed up. The resistor R10 determines the temperature at which the signal reaches such level, which may, for example, correspond to 180° F. A potentiometer A2 provides a tap that may be adjusted to select a desired portion of the difference between the engine temperature signal ETS and the reference potential on the conductor 194. This sets the slope of the characteristic curve and determines the rate at which the signal ENR V on the conductor 186 varies with engine temperature. The signal at the tap of the potentiometer A2 is compared with the reference potential on the conductor 194 in a comparator comprising N1-1, 2, 3.

When the engine is warmed up, the signal picked off at the tap is less than 0.6 volts, and the output of the comparator keeps a transistor Q6 turned off. This allows the 6-volt power supply signal to be applied through a resistor R18 to a follower circuit N3-5, 6, 7 to the conductor 186. On the other hand, when the signal at the tap rises above the reference level the transistor Q6 is caused to conduct through resistors R18, R19 and R20, thereby reducing the input to the follower N3-5, 6, 7 in proportion to the signal difference between the signal on the tap of the potentiometer A2 and the reference potential 0.6 volts.

In general, the slope of the characteristic curve is set to provide for drivability when the engine is cold. This is a relatively short period of time, yet it is critical in car operation as it is important that one be able to start one's car without stalling and without uneven drivability that would be annoying, if not entirely unsafe. On the other hand, as the engine warms up past the critical region, but before it is fully warmed up to its operating temperature, it becomes more important to meet emissions requirements. To this end, an auxiliary reference potential circuit 198 provides an auxiliary reference potential on a conductor 200. The auxiliary reference potential on the conductor 200 is made slightly higher than the reference potential on the conductor 194, as, for example, about 0.65 volts. This is set by the position of a potentiometer A4 to correspond to some particular engine temperature, for example, 75° F. It is the nature of the reference potential circuits 196 and 198 that the potential at their outputs cannot go above the selected reference potentials, while permitting the voltage to go below such values. This means that when the engine is very cold, that is, below the temperature corresponding to the reference set by the potentiometer A4, current flows through the transistor Q6 and flows partly through a resistor R22 as well as through the resistor 20. The enrichment signal ENR V therefore varies with engine temperature according to a temperature characteristic having a slope that is relatively steep, assuring substantial enrichment. Once, however, the engine temperature rises above the temperature corresponding to the setting of the potentiometer A4, current ceases to flow through the resistor R22 to the conductor 200. Thereafter the enrichment voltage varies as a somewhat different function of engine temperature with a flatter slope, until the temperature rises to the temperature corresponding to 0.6 volts on the conductor 194, which may be considered operating temperature. At that temperature, the transistor Q6 ceases to conduct and the enrichment signal ENR V is at the 6-volt reference level.

As mentioned above, one of the more difficult times in operation of an internal combustion is at the start. It is helpful under start conditions to provide additional fuel flow to assure starting. In the circuit of FIG. 9, this is achieved by a cold start enrichment circuit 202. This circuit is activated by application of a starting signal 12V ST on the conductor 102. This enables a transistor Q4 to apply the engine temperature signal ETS to the cold start enrichment circuit 202. This circuit 202 operates much as the cold enrichment circuit 192 to draw additional current through the resistors R18 and R19 to reduce the enrichment control signal ENR V on the conductor 186, thus reducing the ultimate ratio control signal and causing a greater amount of fuel to be supplied by the metering pump 52. In this case, the enabling of the diode Q4 applies the engine temperature signal ETS to a capacitor C2 which holds the voltage after the start signal is removed. The capacitance is then discharged through a potentiometer A3 over a period of time as, for example, 10 seconds. The signal developed on the potentiometer A3 is compared with the reference potential on the conductor 194 to control a transistor Q5 in the manner of the transistor Q6 of the cold enrichment circuit 192, adding enrichment. As the charge on the capacitor C2 is dissipated through the potentiometer A3, the added cold start enrichment gradually tapers off. Thus, the cold start enrichment continues for a time after the start switch is disengaged and dies out after a short period during which the engine almost surely starts and reaches a relatively stable condition where it can remain in operation after the cold start enrichment has been dissipated.

It may be noted that the cold enrichment circuit 192 provides an additional output signal through a resistor R17 to a start circuit 204. This provides a signal corresponding to engine temperature to an amplifier comprising a differential amplifier N1-8, 9, 10 and its associated components. The gain of the amplifier is determined by the setting of a potentiometer A1 connected as a variable resistor. The purpose of the start circuit 204 is to provide a suitable fuel control signal FCV irrespective of air flow through the air flow transducer 44. This enables fuel to be supplied in order to get the engine started in the first place. There are two enabling signals applied to the start circuit 204: one is the wide open throttle signal WOT applied on the conductor 90, and the other is the starting switch indicator 12V ST applied on the conductor 102. As stated above, the wide open throttle signal WOT is at ground when the throttle is fully open; otherwise the signal is normally held high by the 12-volt potential applied through a resistor R43 to the conductor 90. The normally high wide open throttle signal WOT enables a transistor Q1 which then acts to turn off a transistor Q2. This permits a 12-volt start signal applied to the conductor 102 to enable a transistor Q3 to apply the output of the amplifier N1-8, 9, 10 to the conductor 157 as the fuel control signal FCV. The magnitude of this signal is thus dependent upon the signal from the cold enrichment circuit 192 and provides a fuel control signal FCV demanding an amount of fuel that depends upon the engine temperature signal ETS at the time the starting switch is engaged. The function of the WOT signal is to disable the transistor Q3 when the throttle is wide open. When the WOT signal is low, indicating a condition of wide open throttle, it disables the transistor Q1, thereby enabling the transistor Q2 to ground the 12-volt start signal. This shuts the metering pump off during cranking when the throttle is wide open, thus providing an opportunity to clear the engine of flooding merely by flooring the accelerator pedal and turning on the start switch to crank the engine.

Also responsive to the engine temperature signal ETS is a cold circuit 206 wherein a comparator N1-5, 6, 7 senses when the engine temperature signal ETS rises above the reference potential on the conductor 194 and produces an output signal CLD indicating that the engine is cold whenever the engine temperature signal is above the reference. This CLD signal is applied to the conductor 158 by which it is connected to the accelerator pump circuit 6 as described above.

As noted above, the present engine control is designed to operate an engine with a lean air to fuel ratio, such as a ratio of 20:1, when the engine is in its cruise condition. Such a lean mixture is unsuitable when the engine is idling, as it will cause misfires. It is therefore desirable to provide a richer ratio upon idle. This is the function of an idle ratio limit circuit 210. An idle condition could be sensed by sensing the engine speed as indicated by the engine speed signal RPMV. However, in the circuit illustrated, the mass rate of flow of air signal MFV is utilized as an indication of the idle condition. When the engine is idling and the throttle is depressed to accelerate the engine, the engine speed does not immediately change because of the inertia of the engine and its load. The air flow sensor thus responds more promptly to a change from idle. Further, when the engine is under load there is a greater air flow for the same engine speed.

As shown in FIG. 8, the mass rate of flow of air signal MFV is applied over the conductor 146 to the idle ratio limit circuit 210. The signal MFV is compared to a reference potential developed across resistor R3 from the 6-volt power supply. This sets a break point for the control characteristic. The reference potential is set slightly above the signal MFV at idle; thus when the signal MFV is below the reference signal, the idle ratio limit circuit 210 takes the engine to be at idle. When the signal rises above the reference, an output signal is developed across a resistor R7 corresponding to the amount the signal MFV is above the reference. A potentiometer A2 is connected between the resistor R7 and the conductor 186. The tap on the potentiometer A2 thus picks off a signal between that developed across the resistor R7 and the signal ENR V. The position of the potentiometer determines the magnitude of the effect of the idle ratio limit circuit. As indicated above, it is desirable that the engine operate at idle at the leanest ratio that it will operate smoothly without misfire. The lean limit may be, for example, an air/fuel ratio of 16:1. The signal picked off the potentiometer A2 is applied to the + terminal of an amplifier N2-1, 2, 3 which acts to prevent its output on the conductor 188 from rising above the idle limit control signal. This means that even though the run ratio may be set at 20:1 under idle conditions, the idle ratio limit circuit will limit the ratio control signal to correspond to a ratio of 16:1. Further, as the engine goes above idle toward its normal run condition the mass flow signal MFV causes the idle ratio limit circuit to increase the limitation of the ratio control voltage along a slope until the run ratio or some other limit as described below is reached.

It has been found that when starting a car, even with the engine warmed up, the normal run ratio is too lean for proper combustion when the combustion chambers are not hot. That is, after a car has been standing only a brief time, the combustion chambers will be much below their operating temperature, even though the engine coolant temperature is in its operating range. When the engine coolant is cold, as indicated by the engine temperature signal ETS, the cold enrichment circuit 192 provides additional enrichment to avoid the problem. However, when the engine is not cold a start enrichment circuit 212 is provided to add enrichment. In this circuit 212, the closing of the ignition switch to start the engine applies the 12V ST signal to the conductor 102 which is applied through a transistor Q5 to charge a capacitor C2. This charge will remain even after the 12-volt start signal 12V ST is removed until such time as the charge leaks off through a resistor R16 and a potentiometer A1 as well as through resistors R14 and R15. The time constant for such discharge is made whatever may be convenient for a particular engine, such as 30 seconds. The charge on the capacitor thus develops a signal on the tap of the potentiometer A1 that decreases with time after the 12V ST signal is removed. The signal at the tap is applied through an amplifier N1-12, 13, 14 to enable a transistor Q6 and transfer the signal to the + terminal of the amplifier N2-1, 2, 3. This reduces the input thereto in accordance with the start enrichment signal as picked off from the potentiometer A1. The gain of the circuit is, of course, controlled by the setting of the potentiometer A1.

Another circumstance that presents drivability problems is operation at low manifold vacuum. When operating at low manifold vacuum, as at a relatively low engine speed, opening the throttle has little effect on power, for the pressure differential is so small that little additional air flows and hence little additional fuel is supplied. It is therefore desirable to increase power under such circumstances by providing an enriched air/fuel ratio. This is achieved by a power I circuit 214 (FIG. 8). The manifold vacuum signal MVV is applied over the conductor 124 to the power I circuit 214. The power I circuit is essentially the same as the idle ratio limit circuit 210 and operates to place an upper limit on the ratio control signal RCV. That is, if the air/fuel ratio is not limited by some other control signal, it will be limited by the power I output. Thus, when the manifold vacuum signal MVV as applied over the conductor 124 falls below the reference signal developed across a resistor R33, the power I circuit limits the potential on the conductor 188 to prevent the ratio control signal from going above some predetermined limit, such as that corresponding to an air/fuel ratio of 18:1. This limit rises as the manifold vacuum signal rises above the control limit. The effect of the power I circuit is to be concerned more with power than with ecology or economy. That is, for drivability and for power as needed, the power I circuit will override the normal run ratio.

Another circumstance requiring power ahead of ecology or economy is in matters of emergency when it is important to accelerate rapidly, as in passing a truck or avoiding difficulty. It is important to be able to get substantial additional power. This is achieved by a power II circuit 216 (FIG. 8). This circuit is activated by the wide open throttle signal WOT applied over the conductor 90. As stated before, when the throttle goes wide open, the WOT signal goes to ground. This causes a transistor Q1 to turn off, thereby causing a transistor Q2 to conduct, and thus placing one end of a resistor R11 at ground, the other end being connected through a potentiometer A3 to the conductor 186. Grounding the resistor R11 thus reduces the potential at the tap of the potentiometer A3, depending upon where the potentiometer A3 is set, and an amplifier N3-8, 9, 14 then operates like the power I circuit to provide another upper limit to the signal on the conductor 188. This signal would, for example, be equivalent to a ratio of perhaps 14:1. As an alternative it would be possible to apply a ramp signal, that is, a signal that varies with throttle position such as a signal based upon the throttle position signal TPV, which ramp signal introduced the power II limit gradually, as in the case of the power I signal.

It is desirable to have even more power for acceleration when the car is already going at relatively high speed. A power III circuit 218 (FIG. 9) provides such additional power by providing a still lower air/fuel ratio. The power III circuit receives its control input from the transistor Q1 in the power II circuit (FIG. 8). That is, the power III circuit is enabled by the WOT signal at the same time that the power II circuit is activated. The activation signal PWR III is developed on a conductor 220. The conductor 220 is normally held at ground potential by the transistor Q1. This disables a transistor Q7, which in turn disables a transistor Q8, which in turn disables a transistor Q9. However, upon occurrence of a WOT signal indicating a wide open throttle, the transistor Q1 is made non-conductive, whereupon the conductor 220 is raised to the higher potential of the 6-volt supply. This turns on the transistor Q7, which in turn turns on the transistor Q8, which in turn turns on the transistor Q9. The engine speed signal RPMV is applied from the conductor 156 through a resistor R42 to the − input terminal of a comparator N4-1, 2, 3. The + terminal is held at a reference potential picked off a potentiometer A6. When the engine speed signal RPMV is below the reference potential set by the potentiometer A6, the output of the comparator N4-1, 2, 3 is high, and the transistor Q9 does not conduct. This leaves a conductor 222 at the 6-volt power supply level. On the other hand, when the engine speed signal RPMV exceeds the reference level set by the potentiometer A6, the output terminal N4-1 goes low, whereupon the transistor Q9 conducts, causing a potential drop across a resistor R35 which lowers the potential on the conductor 222. This signal X is then applied by the conductor 222 to an output circuit N3-10, 11, 13 (FIG. 8), which acts like the output circuits of the power I and power II circuits to keep the ratio control signal RCV from rising above some particular level. In this case the ratio limit is made equivalent to the maximum power available, which occurs at about a 12:1 air/fuel ratio.

Another problem arises in connection with deceleration of an engine. In deceleration, the throttle is normally closed, resulting in high manifold vacuum and low manifold pressure. This pressure may become so low as to be unable to support the combustion at the normal air/fuel ratio. This results in unburned fuel in the exhaust. A decel ratio limit circuit 224 (FIG. 8) operates to assure a richer mixture under certain deceleration conditions. More particularly, the manifold pressure signal MPV on the conductor 120 is compared to a decel potential DPV applied on a conductor 226. The signal DPV is developed in a manner that will be discussed further below in connection with FIG. 13. When the manifold pressure is so low that the manifold pressure signal MPV is less than the reference signal DPV, transistors Q9 and Q10 are off. This causes a decel ratio limit signal to be applied to a conductor 228 as determined by the setting of a potentiometer A6. This signal is applied to an output circuit N3-2, 4, 5 to limit the potential on the conductor 188 to lower the ratio control signal to the decel ratio limit if it is not otherwise more limited by some other control circuit. As the pressure rises so that the manifold pressure signal MPV is greater than the decel pressure reference signal DPV on the conductor 226, the signal on the conductor 228 is raised. This correspondingly raises the decel limit applied by the output circuit N3-2, 4, 5 to the conductor 188. The limit is raised in accordance with how much the manifold pressure signal MPV exceeds the decel reference signal DPV. The slope of the characteristic is determined by the resistance of a potentiometer A5 connected as a variable resistor.

The throttle bypass control circuit 10 shown in FIG. 10 is substantially the same as the circuit shown in FIG. 5 of copending patent application Ser. No. 783,614 and functions in the manner of the circuit described in said copending patent application for controlling the flow of air through the bypass throttle 68. The circuit of the copending application includes a temperature circuit 178 that is comparable to a cold idle circuit 230 shown in FIG. 9. As described in the copending application in connection with such temperature circuit, the cold idle circuit 230 operates in response to the engine temperature signal ETS on the conductor 93 to produce a cold idle signal C.I. on a conductor 232 which is applied to the circuit of FIG. 10. The output of the throttle bypass control 10 applies a control signal B.P. SOL. on the conductor 70 to control the position of the bypass throttle 68 in the manner described in the aforesaid application Ser. No. 783,614. An alternative throttle bypass control circuit would provide a more complicated characteristic for control by the throttle position signal TPV to provide a progressive throttle bypass control signal in which air flow increases more sharply with throttle position when the throttle is wider open. This makes for smoother control and drivability.

Adverting now to the timing control circuits, the ignition timing control circuit 11 as shown in FIG. 11, basically responds to the run pickup signal RUN PICKUP on the conductor 106 and a timing control signal TCV as applied to a conductor 236 from the timing advance circuits 12 and 13. The development of the timing control signal TCV will be discussed further below in connection with FIGS. 12 and 13. The run pickup signal RUN PICKUP and the timing control signal TCV are applied to a trigger circuit 238 which produces an output pulse on a conductor 240 at a time determined by the timing control signal TCV. That is, the run pickup signal RUN PICKUP establishes a time reference, and at a time thereafter, as determined by the timing control signal TCV, an output trigger pulse TRIGGER is produced on the conductor 240. As mentioned above, the run pickup sensor 104 may be magnetic means associated with the ignition distributor in the ignition system 24 to provide a time base identification of the position of the engine. For example, the run pickup signals RUN PICKUP may occur 60° before top dead center of each cylinder.

The run pickup signals RUN PICKUP are applied to a conditioning circuit 242 which acts to convert the incoming signals to corresponding sharp pulses suitable for triggering a bistable multivibrator 244 comprising transistors Q4 and Q5. When a pulse applied from the conditioning circuit 242, it turns on the transistor Q4 and thereupon turns off the transistor Q5. It also turns off a transistor Q6 connected across a capacitor C10. The capacitor C10 is thereupon charged over a conductor 246 at a rate determined by a position-time converter 248. The capacitor C10 charges until the voltage thereon as applied to the − input terminal of a comparator N4-5, 6, 7 rises to the potential on the + input terminal. The latter voltage is determined by the timing control signal TCV applied over the conductor 236. The time it takes for the capacitor C10 to charge to the reference voltage determined by the timing control signal TCV is a time that is determined by the magnitude of the timing control signal TCV. The time at which the capacitor C10 reaches this potential will therefore occur at a particular time following a particular run pickup pulse on the conductor 106 which triggered the bistable multivibrator 244. When the signal on the − input terminal of the comparator exceeds the reference potential on the + input terminal, the output goes negative applying a negative trigger signal TRIGGER to an ignition pulse circuit 250.

The ignition pulse circuit 250 acts in response to a trigger pulse to produce a suitable ignition pulse on the conductor 112 for application to the ignition system 24. The ignition system thereupon acts to produce a suitable spark discharge in a particular combustion chamber in the usual fashion.

The position-time converter 248 is controlled by the engine speed signal RPMV which is developed in an RPM circuit 252. In this case the run pickup signals RUN PICKUP are utilized to mark each cycle of rotation of the engine and hence develop a signal RPMV indicative of engine speed. The run pickup signals RUN PICKUP are conditioned by a signal conditioner 254 to produce corresponding pulses suitable for operating a frequency to voltage converter 256. The frequency to voltage converter 256 operates to produce an output signal RPMV on the conductor 156 which is proportional to the rate of incoming pulses. This signal is therefore indicative of engine speed.

The position-time converter 248 operates to control the charging rate of the capacitor C10 and hence the time for the voltage thereon to reach the reference level determined by the timing control signal TCV. To relate engine position to time, it is necessary to know the speed of rotation of the engine. This relationship is achieved by charging the capacitor C10 at a rate dependent upon engine speed. In other words, if the engine is traveling twice as fast the capacitor C10 must be charged twice as fast in order that it reach a particular voltage level at the same relative engine position, and hence at the same relative angle in respect to the run pickup signal RUN PICKUP on the conductor 106. In the position-time converter 248, the engine speed signal RPMV is applied to the + terminal of an amplifier N3-1, 2, 3. With the current mirror circuit shown comprising resistors R33 and R34 and transistors Q1 and Q2, the current through the transistor Q2 and hence the current charging the capacitor C10 are proportional to the engine speed signal RPMV. This makes timing angles independent of engine speed. The ignition pulses on the conductor 112 are thus instituted at a predetermined angular position following each RUN PICKUP pulse on the conductor 106, as determined by the timing control signal TCV applied to the conductor 236. The proportionality factor relating position to time is determined by the resistance of a resistor R35.

During starting it is desirable to operate independently of the timing control voltage, and instead to cause the ignition pulses to occur during starting at a particular angular position in the cycle. A start condition is sensed by a start timing circuit 258 which senses when the engine speed signal RPMV is less than a reference potential set on a resistor R40. Under such condition a signal is developed on a conductor 260 to keep the transistor Q6 turned on until the engine speed rises above the reference level. It may be presumed that the engine is in a start condition when the engine speed is below this reference level, which level is set below idle speed. This assures that the capacitor C10 not be charged and the comparator N4-5, 6, 7 thus not produce an output trigger pulse during starting. Instead, the trigger pulse is derived from the start pickup signal START PICKUP applied to the conductor 110. This signal is applied to a pulse conditioning circuit 262 which operates in much the fashion of the pulse conditioning circuit 242. In this case the output pulses operate to reset the bistable multivibrator 244, at which time the multivibrator applies a trigger pulse directly to the conductor 240. Ignition pulses are therefore produced at the terminal 112 at the appropriate time for starting as determined by the start pickup pulses on the conductor 110.

The timing control signal TCV as applied to the conductor 236 is developed in the timing advance circuits 12 and 13 of FIGS. 12 and 13 in response to signals from various of the sensors and signals developed in other parts of the controller. In general, the timing control signal TCV may be said to be the sum of a number of timing advance signals with various limits superimposed. The signals are summed in a summing circuit 264. The summing circuit 264 includes a summing point 266 and a summing resistor R8 connected between the summing point and ground. Signals from the various advance and limit circuits are applied through switches to the summing point 266. These signals are summed across the resistor R8, and the summed signal is applied through a follower amplifier N3-1, 2, 3 to develop the timing control signal TCV on the conductor 236.

As stated above, conventional timing controls include centrifugal means for advancing the spark as speed increases and vacuum means for advancing the spark as manifold vacuum increases. The spark advance with engine speed is used to compensate for delays in flame propagation in the burning of the fuel during each firing of a cylinder. More particularly, because it takes time for the flame front to propagate, a spark that is timed properly at one speed will not be proper at other speeds. If speed is increased and the spark occurs at the same angular position as before the increase, the engine moves faster relative to the flame front and the flame front is therefore relatively delayed. To compensate for this, the spark is advanced so that the burning starts earlier and peak pressure arrives at the appropriate time in the engine cycle.

In respect to the vacuum advance, it is evident that the flame front will advance more slowly at high vacuum. This is because the air density is lower. Spark timing that is appropriate at one level of vacuum is too late at greater vacuum because the flame front does not propagate as fast. Thus, at high vacuum levels it has been conventional to advance the spark. In the circuit of the present invention spark is advanced pursuant to manifold pressure rather than manifold vacuum, because it is absolute air density that is significant in the rate of propagation of the flame front. On the other hand, a circuit responsive to manifold vacuum could be used and has the advantage that manifold vacuum sensors are less expensive than manifold pressure sensors.

FIG. 14 illustrates typical controller timing characteristics produced by the timing advance circuits 12 and 13. More particularly, in FIG. 14A are illustrated the RPM advance characteristic RPMA and the manifold pressure advance characteristic MPA. The RPM advance characteristic is a curve of timing advance as a function of RPM and the manifold pressure characteristic is a curve of timing advance as a function of manifold absolute pressure (MAP) in inches of mercury.

The RPM advance characteristic RPMA is developed by an RPM advance circuit 270 as shown in FIG. 12. As there shown, the RPM control signal RPMV is applied over the conductor 156 and through resistors R36 and R35 to the + terminal of an amplifier N2-1, 2, 3. The − terminal is biased by a reference potential developed at the junctions of resistors R34 and R32 connected as a voltage divider across the 6-volt power supply. When the signal applied to the + terminal exceeds the bias level on the − terminal, a transistor Q10 is caused to conduct current in proportion to the magnitude of the signal applied to the + terminal relative to the reference potential. A reference signal RPMI is developed by a potentiometer A7 and applied through a follower circuit to the tap of a potentiometer A5 connected as a variable resistor. The other side of the potentiometer A5 is connected to the + terminal of an amplifier N1-1, 2, 3. The transistor Q10 conducts through the potentiometer A5 and hence reduces the potential at the + terminal in proportion to the amount by which the RPM control signal RPMV exceeds the reference level applied to the − terminal of the amplifier N2-1, 2, 3. When the RPM control signal RPMV is below the bias level of the amplifier N2-1, 2, 3 and the transistor Q10 is therefore off, the reference signal RPMI is applied through the potentiometer A5 to the terminal N1-3 of an amplifier N1-1, 2, 3. As the RPM control signal RPMV rises above the bias level, the signal at the terminal N1-3 falls proportionally. The signal applied at the terminal N1-3 controls the flow of current through a transistor Q9 to maintain the signal level at the emitter of the transistor Q9 at the level of the signal on the terminal N1-3. This determines the current through a resistor R31 and thence the current through the transistor Q9. This current is applied through a switch S1-1 and a conductor 272 to a summing point 274 which is connected by a conductor 276 to the summing point 266. This signal on the conductor 272 corresponds to a number of degrees of spark advance and is the spark advance signal RPMA.

In the idle range, engine operation is somewhat unstable. It is therefore desirable that a fixed spark advance be applied during the idling of the engine. Idling may be taken as an engine speed below some reference speed and hence with an RPM control signal RPMV less than some reference potential, in this case the reference level established by the bias across the resistor R32. Up to that point, the transistor Q10 is disabled and the reference potential RPMI is applied to the amplifier N1-1, 2, 3 to produce an output RPM advance control signal RPMA corresponding to RPMI as illustrated in FIG. 14A.

Once the transistor Q10 becomes conductive, that is, when the RPM control signal RPMV rises above the idle bias level, current flows through the transistor Q10 and the potentiometer A5 to lower the potential at the input terminal N1-3. This increases the flow of current through the transistor Q9 and hence raises the output signal RPMA. The relationship between the RPM control signal RPMV and the current flow in the conductor 272 is determined by the resistance of the potentiometer A5, which thus determines the slope of the characteristic curve RPMA as shown in FIG. 14A.

At high speeds it is desirable that the rate of advance with speed be less. In fact, at high speeds, turbulence causes the fire front to sweep the cylinder so rapidly that further advance is not necessary or desirable. To limit the advance at high speed, a reference potential RPMA STOP is established by a potentiometer A8. An amplifier N2-5, 6, 7 and a diode D4 keep the terminal N2-6 from rising above the reference potential RPMA STOP. This means that when the RPM control signal RPMV rises above the reference potential RPMA STOP, the potential at the terminal N2-3 is held to the level RPMA STOP. This puts an upper limit to the characteristic curve for the RPM advance signal as shown in FIG. 14A.

The manifold pressure advance signal MPA is developed in a manifold pressure advance circuit 278. This circuit responds to the manifold pressure signal MPV applied on the conductor 120. The manifold pressure signal MPV is amplified by a follower circuit comprising an amplifier N5-1, 2, 3 which develops a corresponding manifold pressure signal MPVB on a conductor 280. This signal is applied through a potentiometer A10 and a resistor R28 to a pair of amplifiers N6-1, 2, 3 and N7-5, 6, 7. The signal is applied to the amplifier N6-1, 2, 3 by way of an integrating circuit consisting of a capacitor C8 and a variable resistor A11. The integrating circuit effectively delays the application of the signal to the amplifier N6-1, 2, 3. The outputs of the respective amplifiers are applied through respective diodes D4 and D5 to a terminal 282 connected to ground through a resistor R31. The terminal 282 is biased from the 6-volt power supply through a potentiometer A12 and a resistor R30, the potentiometer A12 and the resistances R30 and R31 constituting a voltage divider. The amplifiers N6-1, 2, 3 and N7-5, 6, 7 are connected so that the more positive output of the amplifiers controls the diodes D4 and D5 decoupling the more negative output from the terminal 282.

Because the input to the amplifier N6-1, 2, 3 is applied by way of an integrating circuit, the input thereto is delayed. Thus, when the manifold pressure signal MPV rises, the output of the amplifier N7-5, 6, 7 rises at once, in unison with the manifold pressure voltage MPV, whereas the output of the amplifier N6-1, 2, 3 lags behind. Thus, the output of the amplifier N7-5, 6, 7 controls as atmospheric pressure increases. On the other hand, the output of the amplifier N6-1, 2, 3 also lags as the pressure drops. As this leaves the output of the amplifier N6-1, 2, 3 higher than the output of the amplifier N7-5, 6, 7, the amplifier N6-1, 2, 3 controls when the manifold pressure drops. This means that the signal appearing on the terminal 282 rises in unison with manifold pressure, but drops more slowly dependent upon the time constant of the integrating circuit comprising the capacitor C8 and the variable resistor A11. The resistor A11 is adjusted to provide a suitable time constant.

The difference between the 6-volt supply and the signal on the terminal 282 appears across the potentiometer A12 in series with the resistor R30. A portion of this difference is picked off at the tap of the potentiometer A12 and applied to the + terminal of an amplifier N7-1, 2, 3. The − terminal is connected to the 6-volt power supply through a resistor R32. A transistor Q6 operates to draw current through the resistor R32 so as to maintain the potential at the − terminal equal to that picked off the tap on the potentiometer A12. The transistor Q6 is effective until the potential at the tap reaches 6 volts at which time the transistor Q6 is turned off, as the potential on the negative terminal N7-2 is as high as it can get, namely with no current flowing through the resistor R32. In the circuit as illustrated, this occurs at a manifold pressure signal MPV of 6 volts. The sensor 94 is calibrated so that 6 volts represents atmospheric pressure of 30 inches of mercury. This establishes the point at 30 inches of mercury and 0° manifold pressure advance MPA as shown in FIG. 14A.

As manifold pressure goes down from atmospheric, a voltage is developed across the tapped portion of the potentiometer A12 and current flows through the resistor R32 and the transistor Q6 in proportion to the signal difference, with a characteristic slope determined by the setting of the potentiometer A12. The potentiometer A12 thus determines the slope S1 of the curve shown in FIG. 14A. The current is applied through a diode D7 and a switch S2-1 to a conductor 284 connected to the summing point 266. In general, it is desirable that the slope of the characteristic at higher pressures be greater than the slope at lower pressures. Indeed at lower pressures the slope may be as low as zero. To provide a second slope, a manifold pressure break reference signal is developed on a potentiometer A9. This reference signal is applied through an amplifier N6-5, 6, 7 and a diode D2 to keep a reference terminal 286 from rising above the manifold pressure break reference potential. This means that when the manifold pressure signal at the conductor 280 rises above the reference potential on the terminal 286, the signal picked off the tap of the potentiometer A10 responds to the manifold pressure signal to a lesser degree providing a different slope to the characteristic curve. As shown in FIG. 14A, the break in the curve occurs at the potential corresponding to the manifold pressure break reference signal developed at the potentiometer A9, and the slope S2 at lower pressures is determined by the setting of the potentiometer A10.

An idle signal IDLE is developed in an idle timing limit circuit 324 when the engine is idling. The IDLE signal is applied on a conductor 288, and operates at idle to turn on a transistor Q5 to apply the 6-volt power supply potential to the inputs of the amplifiers N6-1, 2, 3 and N7-5, 6, 7, this simulating a manifold pressure signal indicating 30 inches of mercury. The effect of this is that at idle there is zero manifold pressure advance and the capacitor C8 is entirely discharged. When the engine is speeded up above idle, the manifold pressure advance signal begins from zero and rises slowly in accordance with the time constant of the integrating circuit C8, A11 and instantly returns to 0° upon idling. The effect of the integrating circuit C8, A11 is that the manifold pressure advance signal can rise only slowly but can be retarded promptly. The effect of the idle signal in conjunction with the integrating circuit C8, A11 is that the timing is retarded to provide better emissions control during city driving when there are many stops, but slowly rises to an appropriate timing advance for better mileage in highway driving.

With some engines under some conditions, it may be necessary or desirable to have a relatively low timing advance to meet emissions standards. On the other hand, when maximum power is needed, it would be desirable to advance the spark. Such advance is provided by a throttle position advance circuit 292. The throttle position advance circuit receives its input over the conductor 86 in the form of the throttle position signal TPV. This signal is applied through a follower circuit N3-5, 6, 7 and a resistor R12 to a terminal 294. This signal is there developed across a potentiometer A4 in series with a resistor R16. A portion of the signal is picked off the tap of the potentiometer A4 and applied to an amplifier N7-5, 6, 7, the output of which includes a current mirror circuit 296 which produces an output current through a resistor R23 and thence through a switch S1-4 to a conductor 298. The amplifier N7-5, 6, 7 is biased by a voltage divider comprising a resistor R44 and a resistor R21 and by a voltage divider comprising a resistor R17 and a resistor R16. These potentials determine the throttle position or throttle position signal TPV at which the output of the amplifier N7-5, 6, 7 drives a transistor Q5 of the current mirror 296 into conduction. Above that throttle position, that is, with the throttle wider open, the throttle position advance signal rises with throttle position in accordance with the characteristic illustrated in FIG. 14B as the curve TPA, the throttle position advance characteristic. The curve begins at zero advance at the throttle position determined by the bias potentials determined by the resistors R17, R16, R44 and R21. The characteristic then rises linearly in accordance with the gain determined by the potentiometer A4.

Engines operate at a higher temperature when running at a higher speed. Thus, when the throttle is opened to accelerate the engine, the engine is cooler than it will be when it reaches the desired speed. This indicates the desirability of advancing the timing upon acceleration. A Δ throttle position advance circuit 300 provides such additional spark advance. In this circuit, the signal at the terminal 294 is applied to a differentiating circuit comprising a capacitor C3 and a potentiometer A3. A signal is developed at the tap of the potentiometer A3 that decays with a time constant of perhaps one second to develop a differential signal. This signal is applied through an amplifier N7-1, 2, 3 and a current mirror circuit 302, producing an output signal ΔTPA through a switch S1-3 to a conductor 304 connected to the summing point 274. The magnitude of this signal is determined by the change in the throttle position signal TPV and the setting of the potentiometer A3. An amplifier N6-1, 2, 3 and a diode D2 operate to keep the change signal from going negative. That is, the signal ΔTPA can go only positive. This means that additional spark advance is provided upon movement of the throttle in the opening direction, but subtracts nothing when the throttle is moved toward its closed position.

Because hotter ambient air results in faster burning in the cylinders, less advance is needed when the air temperature is high. To this end, a temperature limit circuit 306 is utilized to limit the advance provided by the throttle position advance circuit 292 and the Δ throttle position advance circuit 300. The input signals to the temperature limit circuit 306 are the air density signal ADV applied on the conductor 128 and the barometric pressure signal BPV applied on the conductor 116. The barometric pressure signal is applied to an amplifier N4-5, 6, 7 to produce a corresponding signal at N4-7. This signal is applied across a potentiometer A2 in series with a resistor R5. The tap on the potentiometer A2 thus provides a signal proportional to the barometric pressure signal BPV. Similarly, the air density signal ADV is applied to an amplifier N4-1, 2, 3 which produces at N4-1 a signal corresponding to air density. An air density is proportional to barometric pressure and inversely proportional to temperature, the signal developed at the tap of the potentiometer A2 corresponds to air density at some temperature. The setting of this tap determines a temperature TPT at which the signal at the tap is equal to the air density signal at N4-1. In the example illustrated by FIG. 14B, this temperature is about 170° F. The signal at the tap of the potentiometer A2 is applied through a follower circuit N5-5, 6, 7 and applied through a resistor R6 to the − terminal of an amplifier N5-1, 2, 3. A potentiometer A1 is connected between N5-6 and N4-1. The tap on the potentiometer A1 is connected to the + terminal of the amplifier N5-1, 2, 3. The amplifier N5-1, 2, 3 thus amplifies a portion of the difference between the air density signal ADV and the reference signal corresponding to air density at a particular voltage as developed by the potentiometer A2. The output of the amplifier N5-1, 2, 3 is applied through a current mirror 308 to develop a corresponding signal across a resistor R9. That signal is applied through an amplifier N6-5, 6, 7 and a diode D1 to the terminal 294. The setting of the potentiometer A1 determines the slope TPT SLOPE of the characteristic temperature limit curve TPTL as shown in FIG. 14B. The effect of the temperature limit circuit 306 is to prevent the signal at the terminal 294 from rising above the signal developed by the temperature limit circuit 306 across the resistor R9. This limits both the temperature position advance signal TPA and the Δ temperature position advance signal ΔTPA, preventing either from rising above the limit TPTL set by the temperature limit circuit 306.

Burning rate varies with the richness of the air/fuel mixture. It has been determined, for example, that at least in certain engines under certain conditions the engine begins knocking at an air/fuel ratio of about 16. At leaner ratios more advance can be used due to slower flame propagation. This is achieved by a ratio control advance circuit 310 to provide a characteristic curve RCA as shown in FIG. 14C. The ratio control advance circuit receives as an input signal the ratio control signal RCV on the conductor 160. A reference potential is developed by a voltage divider formed by resistors R23 and R24. An amplifier N4-12, 13, 14 develops this same reference potential at N8-14. The ratio control signal RCV is applied to an amplifier N8-1, 2, 3 to produce a signal at N8-2 that is at least as high as the ratio control signal RCV. A diode D1 causes the signal at N8-2 to be held at the reference level developed at N8-14 should the signal RCV be below the reference potential. A potentiometer A8 is connected between N8-2 and N8-14. The tap of the potentiometer A8 is thus some portion of the amount that the signal at N8-2 is above the reference potential at N8-14. If the ratio control signal RCV is not above the reference potential, than the tap of the potentiometer A8 remains at the reference potential. Amplifiers N8-5, 6, 7 and N8-8, 9, 10 cause current to flow through a resistor R25 in proportion to this difference. This current flows through a transistor Q4 and a switch S2-2 to supply current through a conductor 312 corresponding to the desired ratio control advance RCA according to the characteristic illustrated in FIG. 14C. The point of the curve at 0° advance is established by the voltage dividers R23 and R24. The slope RCVG of the curve is determined by the setting of the potentiometer A8. Thus, the reference potential may be equivalent to a 16:1 air/fuel ratio, so that above this ratio, the timing is advanced in accordance with the characteristic illustrated. This current is applied to the summing point 266 through the switch S2-2.

For the sake of emission control, engines are ordinarily operated at less than maximum efficiency. For example, they are usually run slightly retarded during normal engine operation. There are, however, occasions when it is more important to assure smooth operation. Perhaps the most difficult time an engine has is at starting. To assure appropriate operation while the engine is being started and until it is warmed up, it is desirable to operate at greater efficiency, even though this may for a time increase emissions. To this end, a start advance circuit 314 provides an additional advance signal. The start advance circuit receives its input from the ignition switch as the 12V ST signal over the conductor 102. The 12V ST signal turns on a transistor Q12 to charge a capacitor C6 from the 6-volt power supply when the starter switch is closed to operate the starter motor. This charge then leaks off slowly through a potentiometer A6 and a resistor R39 connected in series across the capacitor C6. A portion of the potential across the capacitor C6 is picked off by the tap of the potentiometer A6. As one end of the potentiometer A6 is connected to the 6-volt power supply, the signal at the tap of the potentiometer A6 thus is driven somewhat negative with respect to the 6-volt power supply and gradually rises to 6 volts as the capacitor C6 discharges through the resistor R9 and the potentiometer A6. The time constant may be set, for example, at 90 seconds. The signal on the tap of the potentiometer A6 is applied to an amplifier N3-1, 2, 3 which controls the current flow through a transistor Q11 and a resistor R38 to maintain the current through the resistor R38 proportional to the difference between 6 volts and the potential at the tap of the potentiometer A6. This thus introduces current through a switch S1-2 and thence through a conductor 316 to the summing point 274 as the start advance signal STA. The initial magnitude of the current is determined by the setting of the potentiometer A6 and the duration of the start advance signal is determined by the time constant of the circuit C6, A6, R39. 90 seconds is a convenient time for expecting the engine to be started and in reasonable running condition. A start advance of about 10° has been found acceptable in certain engines.

When the engine is cold, the burning of the fuel in the cylinders is slower than when the engine is warmed up. To provide appropriate timing when the engine is cold, a cold advance signal is introduced by a cold advance circuit 318. The input to this circuit is the cold signal CLD applied over the conductor 158. This signal, which is high when the engine temperature is below the predetermined level, is used to turn on a transistor Q7. This provides an inverted cold signal CLD-2 on a conductor 320. At the same time, the closing of the transistor Q7 causes current to flow through a voltage divider formed of resistors R27 and R28, turning on a transistor Q8 and causing current to flow through a resistor R30 and a switch S1-5 and thence through a conductor 322 to the summing point 274. The cold advance signal CLDA is the current thus determined by the relative magnitudes of the resistances R27, R28 and R30. A diode D3 compensates for the base to emitter drop of the transistor Q8.

The inverted cold signal CLD-2 is also applied by way of the conductor 320 to the manifold pressure advance circuit 278, where the inverted cold signal CLD-2 is applied to a diode D6. It acts to ground the output of the manifold pressure advance circuit when the engine is cold. This turns off the manifold pressure advance. The purpose of this is to cause the engine to heat up faster under light load and thus to arrive more promptly at its operating temperature where it may be caused to run leaner.

Engines often have difficulty running uniformly under idle conditions. Under normal idle conditions, the burning is incomplete in the cylinders and is completed in the hotter exhaust manifold. It is desirable to provide stable idle ignition. This may be achieved by retarding the spark during idle from where it would otherwise be caused to occur with the spark advance circuits described above. The idle timing limit circuit 324 provides means for assuring a particular spark advance during idle conditions. The idle timing limit circuit 324 responds to the mass flow signal MFV on the conductor 146. This signal is applied to the + terminal of a comparator N4-1, 2, 3. A reference potential is developed on a potentiometer A7 and applied to the negative terminal of the amplifier. Until the mass flow signal exceeds the reference potential as set by the potentiometer A7, the potential at the amplifier output terminal N4-1 remains low. A potentiometer A5 and a resistor 11 are connected between the terminal N4-1 and the 6-volt power supply. The tap of the potentiometer A5 can thus be set to provide a potential in between. The potential on the tap A5 is applied through a follower circuit N4-5, 6, 7 and thence through a switch S2-4 through a conductor 326 connected to the summing point 266. The characteristic curve IL for the idle timing limit circuit appears in FIG. 14D. Below idle speed timing signal break level ITB as determined by the potentiometer A7, the idle timing advance is maintained constant at its lower idle timing limit IT as determined by the setting of the potentiometer A5. For example, as shown in FIG. 14D, the idle timing advance is set at 10° up to a flow rate providing an air flow signal of 0.18 volts. When the mass flow signal MFV rises above that corresponding to idle air flow, the difference between the mass flow signal MFV and the idle timing reference signal at the tap of the potentiometer A7 is amplified by the amplifier N4-1, 2, 3 causing the limit signal developed at the tap of the potentiometer A5 to rise in accordance with the characteristic illustrated in FIG. 14D with a slope determined by the magnitude of the resistance of a variable resistor A6. This slope should be relatively steep to assure prompt release of the low idle timing limit when the engine is above idle. On the othe hand, the slope must not be so steep so as to occasion a sharp jump in timing when the engine is operating near idle, as otherwise there would be sharp surges in power.

The idle timing limit signal IL operating through the output circuit N4-5, 6, 7 holds the spark advance signal as developed across the resistor R8 to the maximum permitted by the idle timing limit circuit. That is, the output of the output circuit N4-5, 6, 7 can never rise above the idle limit potential IL developed at the tap of the potentiometer A5.

At the same time, the signal at the terminal N4-1 is applied to the + terminal of an amplifier N5-5, 6, 7 which operates to provide a signal IDLE at the output terminal N5-7 indicative of an idle condition. The IDLE signal is applied to control a transistor Q7 to apply the 6-volt supply voltage to the conductor 284 through a resistor R35 when the engine is idling. This forces the output of the manifold pressure advance circuit high when the engine is idling, assuring that the signal MPA as applied to the summing point 266 forces the signal developed across the summing resistor R8 to the upper limit permitted, which at idle is the low idle timing limit IT.

When the engine overheats, as may be indicated by a signal on a conductor 327 when the overheat warning light goes on, it is desirable to cause the engine to idle somewhat faster to permit it to cool off. This may be achieved by disabling the idle timing limit when the engine is overheated. To this end, the signal OVERHEAT indicating overheating may be applied to turn on a transistor Q3 and thus lower the bias at N4-2.

The IDLE signal is also applied over the conductor 288 to the manifold pressure advance circuit as described above to control the dumping of the charge on the capacitor C8, dumping the charge when the engine speed drops below idle.

A particularly bad time for emissions is when an engine is decelerating. Under such conditions, the fuel is much reduced, as is the air intake. Some fuel will then evaporate from the intake manifold, where it may have accumulated along the manifold walls, and pass into the engine. In general, combustion is poor under these conditions, likely resulting in excessive unburned hydrocarbon emissions. Of course, under these conditions power is not needed or even desired. Hence, it is possible to reduce hydrocarbon emissions without sacrificing any desired or needed power when the engine is decelerating. This may be achieved by assuring that the spark is not far advanced under deceleration conditions. This is the function of a decel limit circuit 328 which provides a deceleration timing limit signal DECEL L in accordance with the characteristic illustrated in FIG. 14D. In this case, the controlling input is the modified manifold pressure signal MPVB as applied to the conductor 280 in the manifold pressure advance circuit 278. A decel reference potential signal DPV is developed on the conductor 226 by a potentiometer A1 and an amplifier N1-5, 6, 7. This reference level DPV is set by the setting of the potentiometer A1 connected to the 6-volt power supply. The reference DPV corresponds to a manifold pressure below which the engine may be considered to be decelerating. A potentiometer A2 is connected between the conductors 226 and 280. The difference between the reference potential on the conductor 226 and the modified manifold pressure signal MPVB therefore appears across the potentiometer A2 and a portion thereof is picked off at the tap of the potentiometer. The setting of this potentiometer thus determines the gain of the circuit and hence the slope of the characteristic curve illustrated in FIG. 14D. This difference signal is amplified by an amplifier N1-1, 2, 3 and is applied through a current mirror circuit 330 to cause the current to flow through a resistor R6 proportional to the amount by which the modified manifold pressure signal MPVB exceeds the reference potential DPV. When the manifold pressure signal is below this level, a transistor Q2 is non-conductive and no current therethrough flows through the resistor R6.

The base of the deceleration limit characteristic as illustrated in FIG. 14D is provided at a terminal 332 by a voltage divider A3 and an amplifier N3-5, 6, 7. The setting of the potentiometer A3 determines the base reference potential developed at the terminal 332. In absence of conduction by the transistor Q2, the base reference potential is applied to the + terminal of a comparator N2-5, 6, 7 which acts like the comparator N4-5, 6, 7 to limit the decel timing advance signal, as developed across the summing resistor R8 to a value no greater than the potential at the + input terminal of the comparator N2-5, 6, 7. The setting of the potentiometer A3 thus determines the base decel advance limit for the portion of the characteristic curve below the decel pressure limit DPV set at the conductor 226. This limit is shown as 20° in FIG. 14D. Above this limit, the characteristic rises with a slope determined by the setting of the potentiometer A2. The output signal DECEL L of the decel timing limit circuit 328 is applied through a switch S2-5 and a conductor 334 to the summing point 266.

It is necessary that the range of timing advance be limited in order that the timing advance not vary so much as to permit firing of the wrong cylinder. That is, the distributor in the ignition system 24 directs ignition current at the appropriate times to the respective spark plugs in the respective cylinders. It is necessary that the ignition pulse intended to create a spark in a respective cylinder occur at such time as the distributor is directing current to that cylinder. If the spark is too advanced it will appear as a late spark for a preceding cylinder. An upper limit to the spark advance is provided by an upper advance limit circuit 338. The upper advance limit circuit comprises simply a potentiometer A4 and a comparator N2-1, 2, 3. This circuit acts to prevent the output signal on an output terminal 340 from rising above the reference potential set by the potentiometer A4. This thus limits the decel limit advance DECEL L at the value determined by the potentiometer A4. As shown in the example of FIG. 14D, this limit is 50°. When the switch S2-5 is closed, this also acts to limit the timing advance signal, however developed, as it limits the voltage rise at the summing point 266.

For similar reasons of limiting the range of the timing advance control, a lower limit of timing advance signal is provided by a lower advance limit circuit 342 (FIG. 12). The lower advance limit circuit comprises a potentiometer A9 which determines the lower reference limit, an amplifier N8-1, 2, 3 and an output diode D5. The diode D5 causes a lower limit signal LL to be coupled through a switch S1-6 to a conductor 344 which is connected to the summing point 274 whenever the lower reference limit is greater than the timing advance signal as otherwise developed at the summing point 274. This prevents the timing advance signal from falling below this reference level LL. Under many circumstances, no lower limit is necessary because the various timing advance circuits themselves assure sufficient advance of the spark as to preclude firing in the wrong cylinder.

A capacitor C4 is connected across the summing resistor R8 and acts to smooth out rapid changes in the timing advance. Thus, the various timing advance circuits provide current to the summing resistor R8 and develop a cumulative signal which is limited by the various limit circuits and is then applied through the amplifier N3-1, 2, 3 as the timing control signal TCV applied over the conductor 236 to the ignition timing controller 11.

Referring to FIG. 14, a switch position chart shown in FIG. 14E indicates which of the various switches are operated to put the various limit circuits or timing advance circuits into the timing advance system. Normally, all of the various control circuits are in the system. However, there are many engines for which the throttle position advance circuit and the Δ throttle position advance circuit are not needed. The switch position indicated as PROG represents a programming position and refers to a switch S2-3 which is part of a test circuit 356 connected by a conductor 358 to the summing point 266. The test circuit 356 applies a full test signal to the summing point 266 and forces the timing to its limit as an aid to checking the setting of the circuits.

Although a preferred embodiment of the circuitry of the controller 2 has been shown, various modifications may be made therein within the scope of the present invention. For example, as mentioned above, not all of the timing circuits need be switched into the timing control system at the same time. Different engines and the different automobiles in which the engines are to be used may dictate other operating controls within the spirit of the present invention. Further, the various limits, reference potentials, and slopes of various characteristics can be adjusted within the skill of the art to meet particular operating requirements and to meet various legal requirements for mileage and emissions control.

In the exemplary circuits, typical components and component values are specified on the drawings. It is to be understood that various DC power supplies are furnished in a conventional manner and that the various integrated circuits are supplied with power in the usual manner.

What is claimed is:

1. In an electronic controller for an internal combustion engine having an ignition system responsive to ignition pulses for producing ignition sparks in combustion chambers and wherein rate of air flow into the intake manifold of the engine is measured by producing an air flow signal systematically related to the rate of air flow, and rate of fuel flow into the engine is measured by producing a fuel flow signal systematically related to the rate of fuel flow, said electronic controller including means responsive to engine parameters for producing a ratio control signal corresponding to a respective air/fuel ratio, and means responsive to said air flow signal, said fuel flow signal and said ratio control signal for controlling fuel flow as to make the ratio of air flow to fuel flow substantially equal to said respective air/fuel ratio, said controller further including means for generating a reference timing signal indicative of movement of the engine to a reference position in the engine cycle, timing advance control means for producing a timing advance control signal corresponding to a respective angular displacement of said engine from said reference position, and means responsive to said reference timing signal and said timing advance control signal for producing ignition pulses at positions relative to said reference timing position systematically related to said timing advance control signal, the improvement wherein said timing advance control means comprises RPM advance means responsive to engine speed for producing an RPM timing advance signal systematically related to engine speed and corresponding to a respective timing advance systematically increasing with increase in engine speed, manifold pressure advance means responsive to manifold pressure for producing a manifold pressure timing advance signal systematically related to manifold pressure and corresponding to a respective timing advance systematically decreasing with increase in manifold pressure, ratio control advance means responsive to said ratio control signal for producing a ratio control timing advance signal systematically related to said ratio control signal and corresponding to a respective timing advance systematically increasing with said increase in respective air/fuel ratio, output means responsive to applied timing advance signals for producing a timing advance control signal corresponding to the sum of the respective timing advances, and means for applying said RPM timing advance signal, said manifold pressure timing advance signal and said ratio control timing advance signal to said output means.

2. Apparatus according to claim 1 wherein said timing advance control means includes limit means for limiting the timing advance control signal to a maximum total timing advance.

3. Apparatus according to claim 2 wherein said limit means comprises means for providing an engine idle reference signal corresponding to engine operation at idle, means for providing a low idle timing limit signal corresponding to a respective timing advance suitable for operation of the engine at idle, means responsive to engine operation and said engine idle reference signal for modifying said low idle timing limit signal in systematic relation to engine operation when said engine operations above idle to produce an idle timing limit signal corresponding to a respective timing advance systematically increasing with increase in engine operation above idle, and means responsive to said idle timing limit signal for limiting the timing advance control signal to a maximum total timing advance corresponding to said idle timing limit signal.

4. Apparatus according to claim 3 including means responsive to engine operation and said engine idle reference signal for forcing said timing advance control signal to the limit corresponding to said low idle timing advance when said engine is at idle.

5. Apparatus according to claim 2 wherein said limit means comprises means for providing an engine idle reference signal corresponding to a reference air flow, means for providing a low idle timing limit signal corresponding to a respective low idle timing advance suitable for operation of the engine at idle, means responsive to rate of air flow into the engine and said engine idle reference signal for modifying said low idle timing limit signal in systematic relation to rate of air flow when said rate of air flow exceeds said reference air flow to produce an idle timing limit signal corresponding to a respective timing advance systematically increasing with increase in air flow above said reference air flow, and means responsive to said idle timing limit signal for limiting the timing advance control signal to a maximum total timing advance corresponding to said idle timing limit signal.

6. Apparatus according to claim 5 including means responsive to rate of air flow into the engine and said engine idle reference signal for forcing said timing advance control signal to the limit corresponding to said low idle timing advance when said rate of air flow does not exceed said reference air flow.

7. Apparatus according to any one of claims 2 to 6 wherein said limit means comprises means for providing a manifold pressure reference signal corresponding to a reference pressure in said manifold, means for providing a base decel timing limit signal corresponding to a respective timing advance signal for combustion in the engine upon deceleration, means responsive to pressure in said manifold and said manifold pressure reference signal for modifying said base decel timing limit signal in systematic relation to manifold pressure when the manifold pressure is above said reference pressure to produce a decel timing limit signal corresponding to a respective timing advance systematically increasing with increase in manifold pressure above said reference pressure, and means responsive to said decel timing limit signal for limiting the timing advance control signal to a maximum total timing advance corresponding to said decel timing limit signal.

8. Apparatus according to any one of claims 1 to 6 including means responsive to starting of the engine for producing at start a start advance timing signal decaying with time and corresponding to a respective timing advance decreasing with time, and means for applying said start advance timing signal to said output means.

9. Apparatus according to any one of claims 1 to 6 including means for providing a temperature reference signal corresponding to a reference engine temperature, means responsive to engine temperature and said temperature reference signal for producing a cold advance timing signal corresponding to a respective timing advance, and means for applying said cold advance timing signal to said output means.

* * * * *

UNITED STATES PATENT AND TRADEMARK OFFICE
CERTIFICATE OF CORRECTION

PATENT NO.  : 4,408,582
DATED       : October 11, 1983
INVENTOR(S) : James W. Merrick It is certified that error appears in the above-identified patent and that said Letters Patent is hereby corrected as shown below:

Column 2, line 28, change "present" to --pressure--.
Column 3, line 59, change "in" to --is--.
Column 7, line 9, change "proportional" to --proportion--.
Column 7, line 47, change "where" to --there--.
Column 10, line 44, change "produce" to --product--.
Column 10, line 52, change "erelatively" to --relatively--.
Column 12, line 62, change "shortcircuits" to --short-circuits--.
Column 13, line 24, change "so called" to --so-called--.
Column 19, line 57, after "pulse" insert --is--.
Column 25, line 63, change "An" to --As--.
Column 26, line 58, change "of" to --on--.
Column 28, line 45, change "othe" to --other--.

Signed and Sealed this

Twenty-eighth Day of February 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,408,582

DATED : October 11, 1983

INVENTOR(S) : Jamer W. Merrick

It is certified that error appears in the above-identified patent and that said Letters Patent is hereby corrected as shown below:

Column 2, line 28, change "present" to --pressure--.
Column 3, line 59, change "in" to --is--.
Column 7, line 9, change "proportional" to --proportion--;
line 47, change "where" to --there--.
Column 10, line 44, change "produce" to --product--;
line 52, change "erelatively" to --relatively--
Column 12, line 62, change "shortcircuits" to --short-circuits--.
Column 13, line 24, change "so called" to --so-called--.
Column 19, line 57, after "pulse" insert --is--.

UNITED STATES PATENT AND TRADEMARK OFFICE
CERTIFICATE OF CORRECTION

PATENT NO. : 4,408,582

DATED : October 11, 1983

INVENTOR(S) : James W. Merrick

It is certified that error appears in the above-identified patent and that said Letters Patent is hereby corrected as shown below:

Column 25, line 63, change "An" to --As--.
Column 26, line 58, change "of" to --on--.
Column 28, line 45, change "othe" to --other--.

Signed and Sealed this

Fifteenth Day of September, 1992

Attest:

DOUGLAS B. COMER

*Attesting Officer*    Acting Commissioner of Patents and Trademarks